United States Patent
Suzuki

(10) Patent No.: US 11,003,399 B2
(45) Date of Patent: May 11, 2021

(54) METHOD, APPARATUS AND NON-TRANSITORY RECORDING MEDIUM FOR REDUCING A PRINTING TIME UTILIZING FILE DIVISION

(71) Applicant: Junji Suzuki, Kanagawa (JP)

(72) Inventor: Junji Suzuki, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 12 days.

(21) Appl. No.: 16/123,178

(22) Filed: Sep. 6, 2018

(65) Prior Publication Data

US 2019/0102125 A1 Apr. 4, 2019

(30) Foreign Application Priority Data

Sep. 29, 2017 (JP) .............................. JP2017-192106
Jul. 26, 2018 (JP) .............................. JP2018-140644

(51) Int. Cl.
*G06F 3/12* (2006.01)

(52) U.S. Cl.
CPC .......... *G06F 3/1212* (2013.01); *G06F 3/1208* (2013.01); *G06F 3/1241* (2013.01); *G06F 3/1245* (2013.01); *G06F 3/1254* (2013.01); *G06F 3/124* (2013.01); *G06F 3/1205* (2013.01); *G06F 3/1248* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,880,913 B2* | 2/2011 | Ford | ....................... | G06F 3/122 |
| | | | | 358/1.1 |
| 10,540,124 B2* | 1/2020 | Mayer | .................... | G06F 3/1276 |
| 10,719,276 B2* | 7/2020 | Wang | ..................... | G06F 3/1212 |
| 10,719,277 B2* | 7/2020 | Wang | ..................... | G06F 3/1206 |
| 10,725,712 B2* | 7/2020 | Wang | .................... | G06F 3/1206 |
| 2011/0170132 A1* | 7/2011 | Mori | ...................... | G06F 3/1205 |
| | | | | 358/1.15 |
| 2012/0050796 A1* | 3/2012 | Yokokura | ............... | G06F 3/121 |
| | | | | 358/1.15 |
| 2014/0340710 A1* | 11/2014 | Yin | .................... | G06K 15/1817 |
| | | | | 358/1.15 |

FOREIGN PATENT DOCUMENTS

| | | | | |
|---|---|---|---|---|
| JP | 2008-189397 | * | 7/2008 | ............... G06F 3/12 |
| JP | 2010-026895 | | 2/2010 | |
| JP | 2010-142980 | | 7/2010 | |
| JP | 2011-054147 | | 3/2011 | |

* cited by examiner

*Primary Examiner* — Barbara D Reinier
(74) *Attorney, Agent, or Firm* — Harness, Dickey & Pierce, P.L.C.

(57) ABSTRACT

An image forming apparatus includes circuitry to receive a file including data of a plurality of pages and position information indicating individual positions of data of the plurality of pages. The circuitry further starts printing of one of the plurality of pages based on data specified by specifying information that indicates a position of data of one of the plurality of pages. The circuitry further starts the printing of one of the plurality of pages when receiving the specifying information before the position information.

17 Claims, 23 Drawing Sheets

FIG. 10A

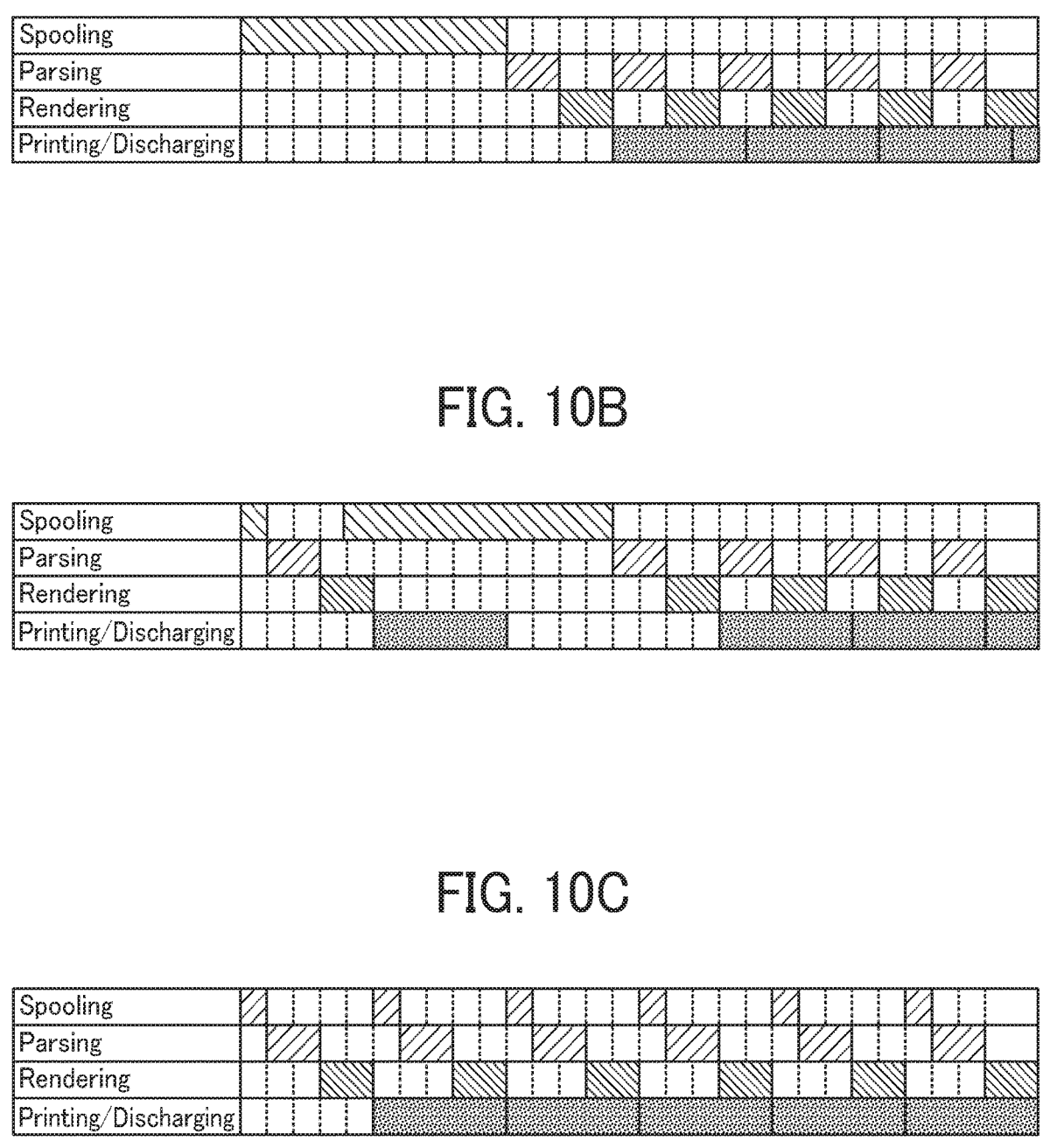

| Spooling | | | | | | | | | | | | | | | | | | | | | | | | | | |
|---|---|---|---|---|---|---|---|---|---|---|---|---|---|---|---|---|---|---|---|---|---|---|---|---|---|---|
| Parsing | | | | | | | | | | | | | | | | | | | | | | | | | | |
| Rendering | | | | | | | | | | | | | | | | | | | | | | | | | | |
| Printing/Discharging | | | | | | | | | | | | | | | | | | | | | | | | | | |

FIG. 10B

| Spooling | | | | | | | | | | | | | | | | | | | | | | | | | | |
|---|---|---|---|---|---|---|---|---|---|---|---|---|---|---|---|---|---|---|---|---|---|---|---|---|---|---|
| Parsing | | | | | | | | | | | | | | | | | | | | | | | | | | |
| Rendering | | | | | | | | | | | | | | | | | | | | | | | | | | |
| Printing/Discharging | | | | | | | | | | | | | | | | | | | | | | | | | | |

FIG. 10C

| Spooling | | | | | | | | | | | | | | | | | | | | | | | | | | |
|---|---|---|---|---|---|---|---|---|---|---|---|---|---|---|---|---|---|---|---|---|---|---|---|---|---|---|
| Parsing | | | | | | | | | | | | | | | | | | | | | | | | | | |
| Rendering | | | | | | | | | | | | | | | | | | | | | | | | | | |
| Printing/Discharging | | | | | | | | | | | | | | | | | | | | | | | | | | |

FIG. 18A

| %Enable Page Split Mode | — PHi |

FIG. 18B

| %Enable Page Split Mode | — PHi |
| 3 0 obj<br>4 0 obj | — PB |

FIG. 18C

| %Enable Page Split Mode | — PHi |
| 3 0 obj<br>4 0 obj<br>%end Page | — PB |

FIG. 18D

| %Enable Page Split Mode | — PHi |
| 3 0 obj<br>4 0 obj<br>%End Page<br>5 0 obj<br>6 0 obj<br>%end Page | — PB |

FIG. 18E

| %Enable Page Split Mode | — PHi |
| 3 0 obj ···<br>4 0 obj ···<br>%end Page<br>5 0 obj ···<br>6 0 obj ···<br>%end Page | — PB |
| 1 0 obj<br>/Catalog<br>/Pages 2 0 R | — PBc |
| 2 0 obj<br>/Pages<br>/Count 1<br>/Kids [3 0 R] | — PBp |
| 0000000000 65535 f<br>··· | — PR |
| /Size 1 0<br>/Root 1 0 R | — PT |

FIG. 19A

```
%PDF-1.7
%Enable Page Split Mode
3 0 obj
4 0 obj
...
<<···Page···>>
1 0 0 obj
...
<<···Page···>>
2 0 0 obj
...
<<···Page···>>
```
— PB
— PB

FIG. 19B

```
%PDF-1.7
%Enable Page Split Mode
3 0 obj
4 0 obj
...
<<···Page···>>
1 0 0 obj
...
<<···Page···>>
2 0 0 obj <<···4 0 R···>>
              \301
<<···Page···>>
```
— PB
— PB1
— PB2

FIG. 24

|  | P1 | P2 | P3 | P4 | P5 | P6 | | | | | | | | | | | | | | | | | |
|---|---|---|---|---|---|---|---|---|---|---|---|---|---|---|---|---|---|---|---|---|---|---|---|
| Spooling | ▨ | ▨ | ▨ | ▨ | | | | | | | | | | | | | | | | | | | |
| Parsing 1 | | ▨ | | | ▨ | | | ▨ | | | | | | | | | | | | | | | |
| Rendering 1 | | | ▨ | | | ▨ | | | | ▨ | | | | | | | | | | | | | |
| Parsing 2 | | | ▨ | | ▨ | | | | | | | | | | | | | | | | | | |
| Rendering 2 | | | | ▨ | | ▨ | | | | | | | | | | | | | | | | | |
| Printing/Discharging | | | | | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ | ▨ |

METHOD, APPARATUS AND NON-TRANSITORY RECORDING MEDIUM FOR REDUCING A PRINTING TIME UTILIZING FILE DIVISION

CROSS-REFERENCE TO RELATED APPLICATIONS

This patent application is based on and claims priority pursuant to 35 U.S.C. 119(a) to Japanese Patent Application Nos. 2017-192106, filed on Sep. 29, 2017, and 2018-140644, filed on Jul. 26, 2018, in the Japan Patent Office, the entire disclosures of which are hereby incorporated by reference herein.

BACKGROUND

Technical Field

Embodiments of the present disclosure relate to an image forming apparatus, an image forming system, a communication system, a method of forming an image, and a non-transitory recording medium storing instructions for executing the method of forming an image.

Related Art

An image forming apparatus such as a multifunction peripheral (MFP) receives various files, such as, for example, a printer control language (PCL) file, a post script (PS) file, and a portable document format (PDF) file to be printed. For a sequential access format file, such as the PCL file or the PS file, content objects of pages is arranged in an order of pages. Accordingly, when receiving such a sequential access type file, the image forming apparatus reads content objects to be printed in sequential order while spooling the data. On the other hand, regarding a random-access format file, such as the PDF file, content objects of pages may be arranged irrespective of page order. Accordingly, the image forming apparatus accesses and prints the content objects of pages while referring to position information, which indicates a position of each of the content objects and is arranged in the rear of the data, after spooling of the received data is completed.

To shorten a time required to display the first page of a PDF file on a browser, a data format called as a linearized PDF, in which position information for accessing content objects of the first page of the PDF file are arranged ahead of the PDF file, is used.

An information processing apparatus divides data described as a linearized PDF into a part corresponding to the first page of the pages and a part corresponding to the rest of the pages, formalizes the linearized PDF again in a manner that two PDF files each of which corresponds to one of the above-mentioned parts are to be referred individually, and instructs an image forming apparatus having a PDF direct print function to analyze the data and output the data.

SUMMARY

An exemplary embodiment of the present disclosure includes an image forming apparatus including circuitry. The circuitry receives a file including data of a plurality of pages and position information indicating individual positions of data of the plurality of pages. The circuitry further starts printing of one of the plurality of pages based on data specified by specifying information that indicates a position of data of one of the plurality of pages. The circuitry further starts the printing one of the plurality of pages when receiving the specifying information before the position information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 10A to 10C are conceptual diagrams each illustrating the time required for printing a PDF file, according to one of the embodiments of the present disclosure;

FIGS. 18A and 18E are conceptual diagrams each illustrating an example of a structure of a PDF file, according to one of the embodiments of the disclosure;

FIG. 19A and FIG. 19B are conceptual diagrams each illustrating a PDF file that includes determination information, according to one of the embodiments of the disclosure;

FIG. 24 is a timing chart illustrating an example of the time required for printing a PDF file, in a case where two parsing processes and two rendering processes are performed in parallel, according to one of the embodiments of the disclosure.

Figure 1:
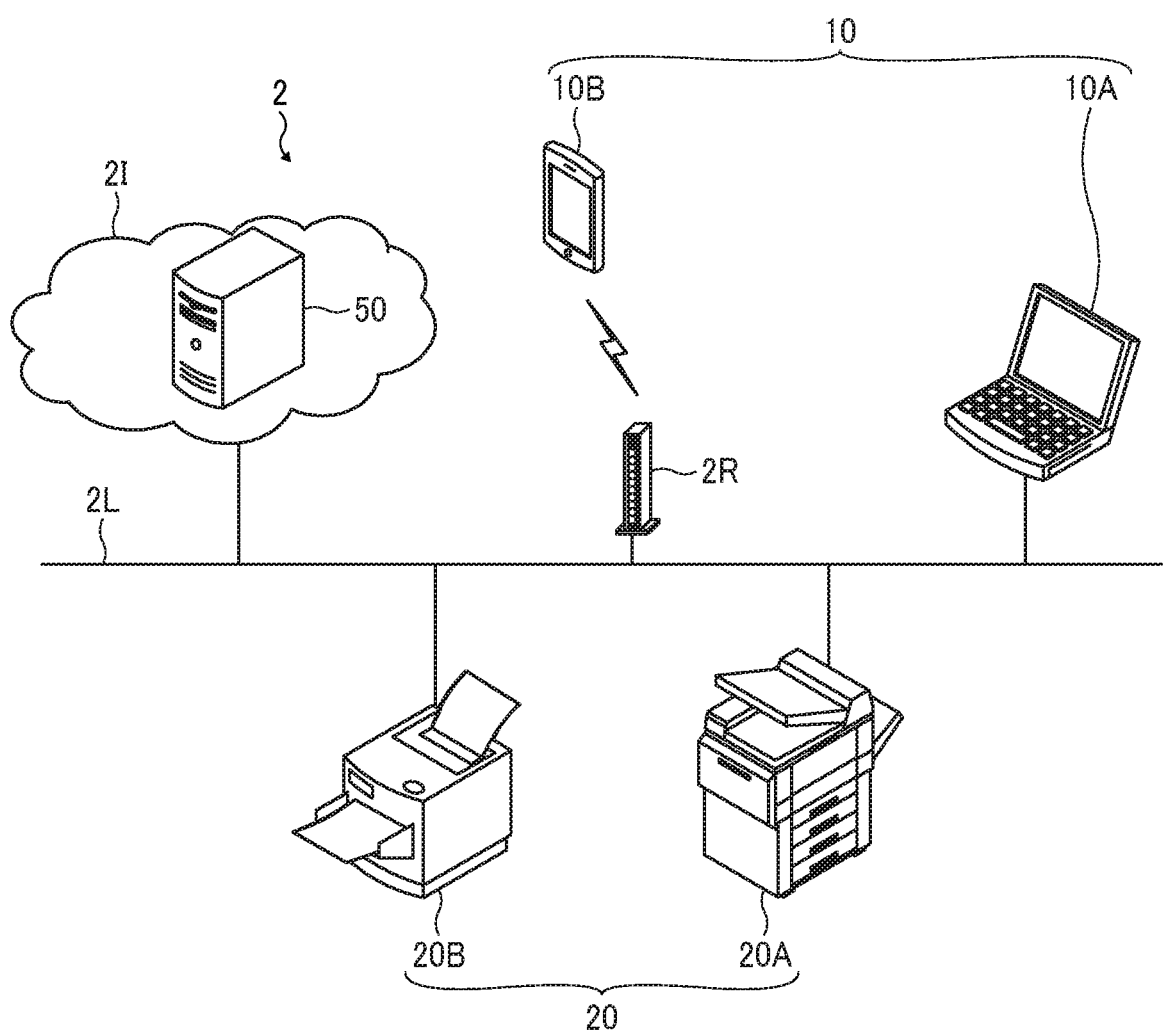
FIG. 1 is a schematic diagram illustrating an overall configuration of a communication system according to one of the embodiments of the present disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of some embodiments of the present disclosure with reference to the attached drawings.

First Embodiment

Communication System

FIG. 1 is a schematic diagram illustrating an overall configuration of a communication system 1 according to one of the embodiments of the present disclosure. Hereinafter, a communication terminal is simply referred to as a terminal. As illustrated in FIG. 1, the communication system 1 includes, for example, terminals 10A and 10B, image forming apparatuses 20A and 20B, and a cloud service 50. An arbitrary one of the terminals 10A and 10 B is referred to as a terminal 10. An arbitrary one of the image forming apparatuses 20A and 20B is referred to as an image forming apparatus 20. In the communication system 1, the number of each of the terminal 10, the image forming apparatus 20, and the cloud service 50 is not particularly limited.

The terminal 10 is an information processing device having a communication function and is, for example, a smart device such as a tablet, a smartphone, a notebook personal computer (PC), a videoconference terminal, an electronic whiteboard, or a camera. In the description of the embodiment, the terminal 10A is a notebook PC, and the terminal 10B is a smart device, for example.

The image forming apparatus 20 is an information processing apparatus having an image processing function and a communication function, and is, for example, an MFP, a facsimile, a scanner, or a printer. In the description of the embodiment, the image forming apparatus 20A is, for example, an MFP having a facsimile, a scanner, and a printer function, and the image forming apparatus 20B is, for example, a printer.

The cloud service 50 is an information processing apparatus having a communication function. The cloud service 50 serves as a server that transmits a document file to the image forming apparatus 20 according to a request from the terminal 10 or the image forming apparatus 20.

The terminal 10 and the image forming apparatus 20 are connected to a local area network (LAN) 2L directly or via a wireless LAN router 2R. The terminal 10 and the image forming apparatus 20 connect to the internet 21 from the LAN 2L and connect to the cloud service 50 on the internet 21. Any one of the LAN 2L and the internet 21 is referred to as a communication network 2. A wireless communication such as wireless fidelity (Wi-Fi) or the like may be enabled in the whole or a part of the communication network 2.

Each of the terminal 10 and the cloud service 50 generates a document file in a random-access format such as a PDF file by using an arbitrary application or a driver. The document file in the random-access format has a file structure that is randomly accessible to data of each page. Each of the terminal 10 and the cloud service 50 transmits a print request including the document file to the image forming apparatus 20. Additionally, the image forming apparatus 20A reads an image by scanning and generates a PDF file using an arbitrary application or a driver. The image forming apparatus 20 receives the PDF file transmitted by the terminal 10, the cloud service 50, or another image forming apparatus 20, and executes a printing process.

Hardware Configuration

Figure 2:
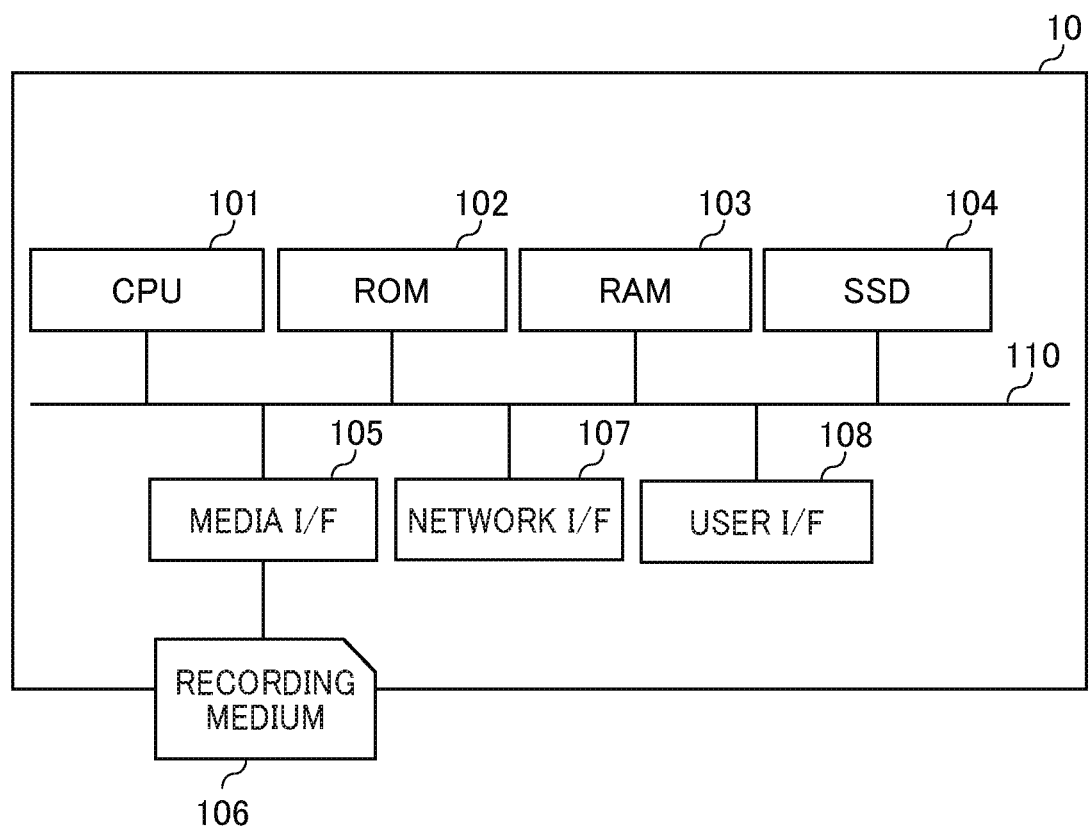
FIG. 2 is a block diagram illustrating a hardware configuration of a terminal according to one of the embodiments of the present disclosure.

FIG. 2 is a block diagram illustrating a hardware configuration of a terminal according to one of the embodiments of the present disclosure. Referring to FIG. 2, a hardware configuration of the communication terminal 10 is described.

The terminal 10 includes a central processing unit (CPU) 101, a read only memory (ROM) 102, a random access memory (RAM) 103, a solid state drive (SSD) 104, a media interface (I/F) 105, a network interface (I/F) 107, a user interface (I/F) 108, and a bus line 110.

The CPU 101 controls the overall operation of the terminal 10. The ROM 102 stores various programs and applications operating on the terminal 10. The RAM 103 is used as a work area for the CPU 101. The SSD 104 stores data used in various programs or applications. The media I/F 105 is an interface for reading out information stored in a recording medium 106 such as an external memory or writing information to the recording medium 106. The network I/F 107 is an interface for communicating with other devices via the communication network 2. The user/F 108 is an interface for accepting an operation input by the user. The user I/F 108 is, for example, a liquid crystal display device or an organic electro luminescence (EL) display device equipped with a touch panel function, or a keyboard and a mouse. The bus line 110 is an address bus or a data bus for electrically connecting the respective constituent elements as illustrated in FIG. 2.

The cloud service 50 is substantially the same as or similar to the terminal 10 in hardware configuration and the description of the hardware configuration is omitted here.

Figure 3:
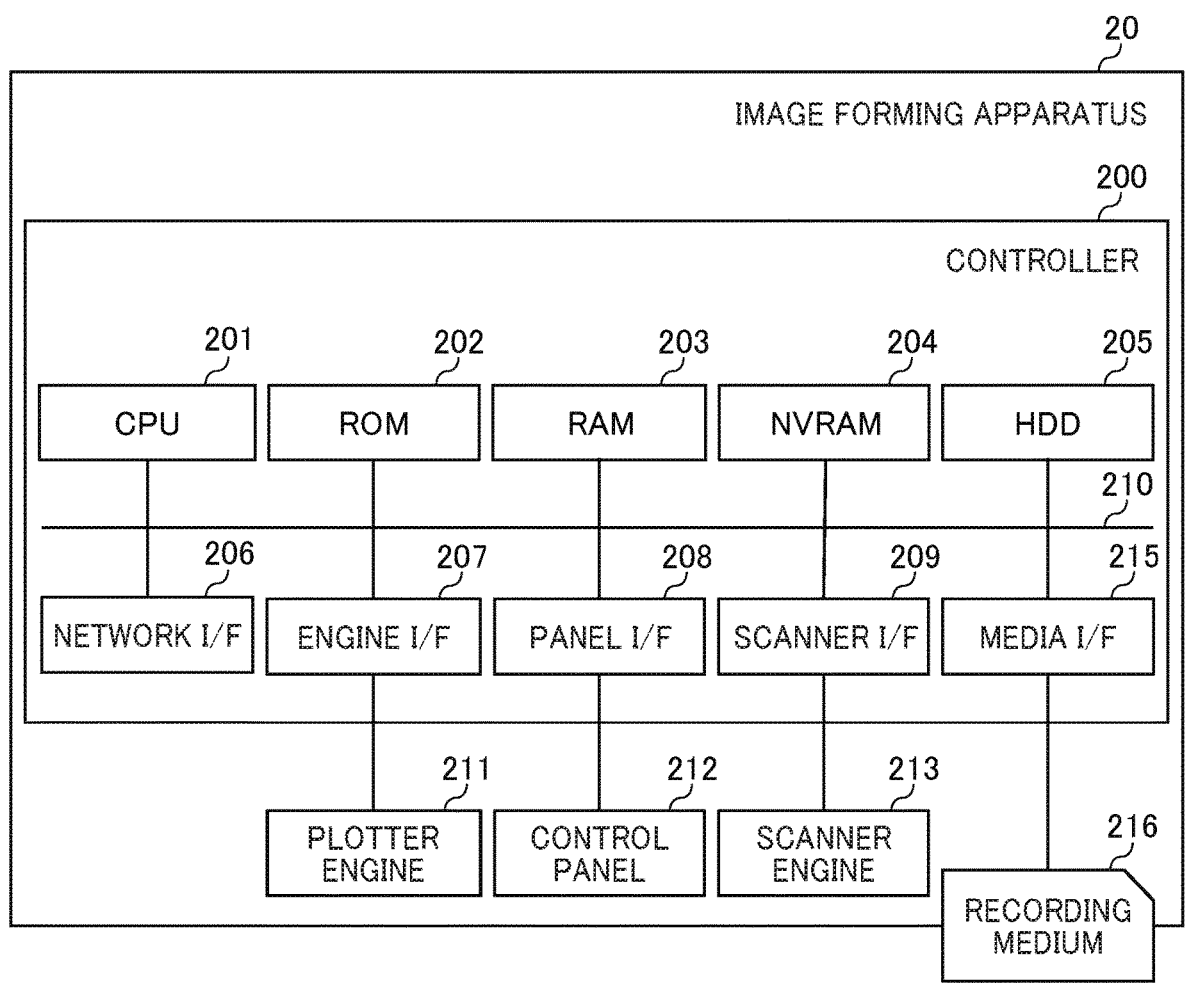
FIG. 3 is a block diagram illustrating a hardware configuration of an image forming apparatus according to one of the embodiments of the present disclosure.

FIG. 3 is a block diagram illustrating a hardware configuration of the image forming apparatus 20. Referring to FIG. 3, a hardware configuration of the image forming apparatus 20 is described.

The controller 200 of the image forming apparatus 20 includes a CPU 201, a ROM 202, a RAM 203, a non-volatile RAM (NVRAM) 204, a hard disk drive (HDD) 205, a network I/F 206, an engine interface (I/F) 207, a panel interface (I/F) 208, a scanner interface (I/F) 209, a media I/F 215, and a bus line 210. Further, the image forming apparatus 20 includes a plotter engine 211, a control panel 212, and a scanner engine 213.

The CPU 201 controls the overall operation of the image forming apparatus 20. The ROM 202 stores various programs and applications operating on the image forming apparatus 20. The RAM 203 is used as a work area for the CPU 201. The NVRAM 204 and the HDD 205 store data used in various programs or applications. The network I/F 206 is an interface for communicating with other devices via the communication network 2. The engine I/F 207 is an interface for connecting to the plotter engine 211. The panel I/F 208 is an interface for connecting to the control panel 212. The scanner I/F 209 is an interface for connecting to the scanner engine 213. The media I/F 215 is an interface for reading out information stored in a recording medium 216 such as an external memory or writing information to the recording medium 216. The bus line 210 is an address bus or a data bus for electrically connecting the respective constituent elements as illustrated in FIG. 3.

The plotter engine 211 controls the operation of the plotter of the image forming apparatus 20 in the process of printing the image on the recording medium. The plotter is an arbitrary printing apparatus. In the case of an ink jet method, for example, the plotter is an ink jet head, and in the case of a laser printer method, for example, the plotter is a photoconductor, a laser irradiation apparatus, or a transfer apparatus. The control panel 212 is a panel for accepting input of settings, conditions, instructions, and the like from the user, and is, for example, a liquid crystal display device or an organic EL display device with a touch panel function, or a keyboard and a mouse. The scanner engine 213 controls the operation of the scanner in the image forming apparatus 20. The scanner is not particularly limited, but examples thereof include a known one having a pressure plate, an automatic document feeder (ADF), and an image sensor.

Functional Configuration

A description is now given of a functional configuration of the image forming apparatus 20, according to the present embodiment.

Figure 4:
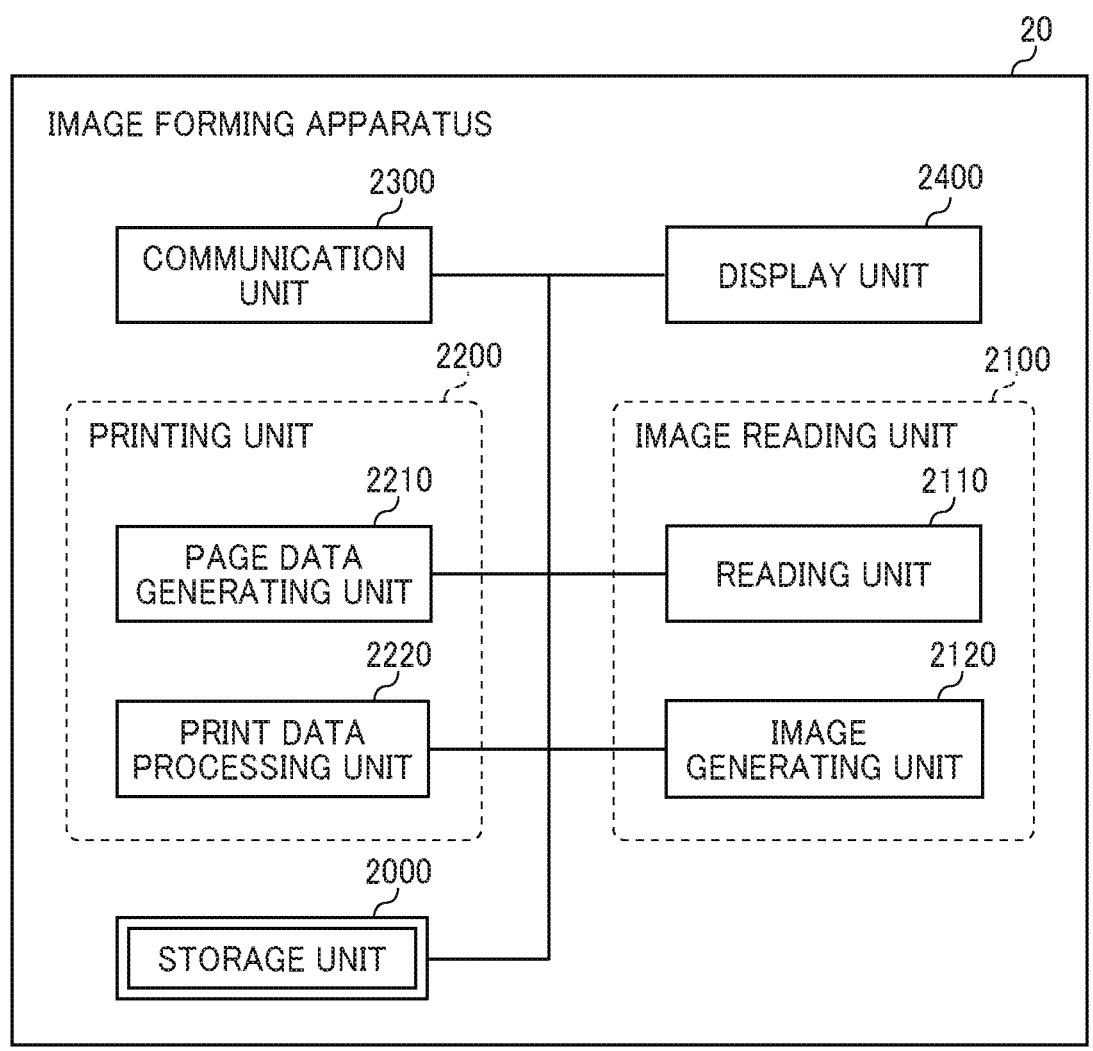
FIG. 4 is a block diagram illustrating a functional configuration of an image forming apparatus according to one of the embodiments of the present disclosure.

FIG. 4 is a block diagram illustrating the functional configuration of the image forming apparatus 20 according to the present embodiment.

The image forming apparatus 20 includes an image reading unit 2100, a printing unit 2200, a communication unit 2300, and a display unit 2400. Each of the above-mentioned functional units (software resources) is implemented by operation of any of the constituent element illustrated in FIG. 3 according to the instruction given by the CPU 201 based on programs and applications for the image forming apparatus 20 stored in the ROM 202 and executed in the RAM 203. Further, the image forming apparatus 20 has a storage unit 2000 implemented by the ROM 202, the RAM 203, the NVRAM 204, or the HDD 205.

The image reading unit 2100 executes processing of reading an image by a scanner and generating a file from the read image based on an instruction from the CPU 201. The image reading unit 2100 includes a reading unit 2110 and an image generating unit 2120.

The reading unit 2110 performs control for reading an image by the operation of the scanner engine 213 according to an instruction from the CPU 101.

The image generating unit 2120 generates a PDF file based on the read image according to an instruction from the CPU 201.

The printing unit 2200 executes processing of printing based on a file according to an instruction from the CPU 201. The printing unit 2200 includes a page data generating unit 2210 and a print data processing unit 2220.

The page data generating unit 2210 generates, from a PDF file including a plurality of pages, a PDF file for each page included in the plurality of pages, according to an instruction from the CPU 201.

The print data processing unit 2220 performs control for printing an image by the operation of the plotter engine 211 based on an instruction from the CPU 101.

The communication unit 2300 controls communication with other devices via the communication network 2 according to an instruction from the CPU 201 and processing of the network I/F 206.

The display unit 2400 performs control of displaying an image from the display of the control panel 212 according to an instruction from the CPU 201.

Operation

A description is now given of operation performed by the image forming apparatus 20 according to the present embodiment of the disclosure.

Figure 5:
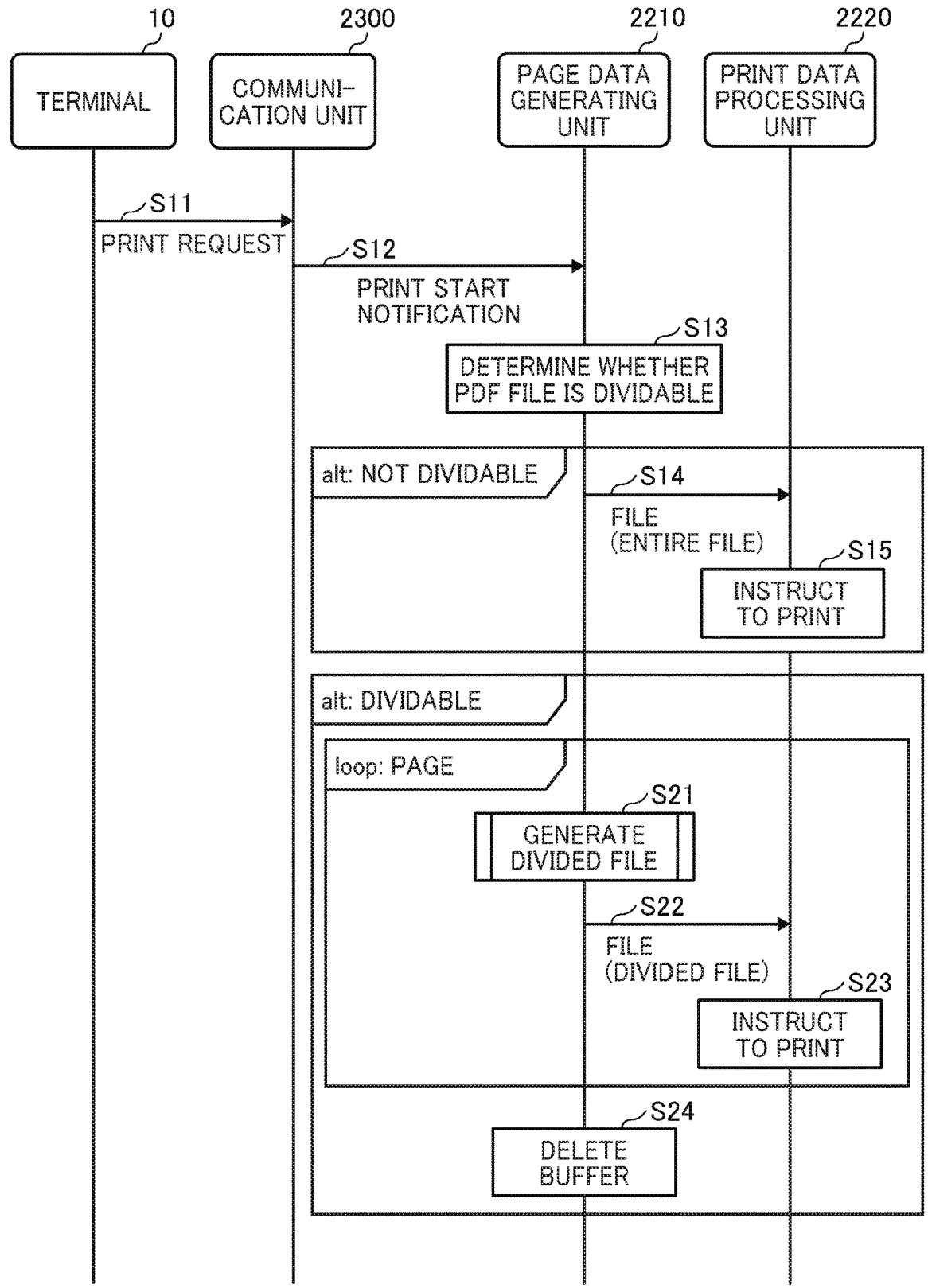
FIG. 5 is a sequence diagram illustrating an example of a process of printing an image, according to one of the embodiments of the present disclosure.

FIG. 5 is a sequence diagram illustrating an example of a process of printing an image (printing process) according to the present embodiment of the disclosure.

The SSD 104 of the terminal 10 stores a PDF file including the plurality of pages generated in the terminal 10. In response to a user input, the terminal 10 transmits a print request to the image forming apparatus 20 via the communication network 2 (step S11). The print request includes, for example, the PDF file read from the SSD 104, and print setup information including information for specifying at least one page to be printed and information indicating a layout, such as 2-in-1.

However, the transmission source of a print request is not limited to the terminal 10. Alternatively, the transmission source of a print request may be the cloud service 50. Additionally, the image forming apparatus 20A may generate a PDF file based on an image read by the scanner and transmit a print request including the PDF file to the image forming apparatus 20B, for example. A print format is not particularly limited, and examples of the print format includes a mobile print such as AirPrint (registered trademark) and Mopria (registered trademark). Further, the print format may be a direct print in which a PDF file is directly transmitted to the image forming apparatus 20 using a protocol such as ftp or lpr. Additionally, the print format may be a cloud print such as Google Cloud Print (registered trademark), for example. Additionally, the print format may be a media print. When the print format is a media print, the step of S11 performed by the terminal 10 in the printing process illustrated in FIG. 5 is replaced with a step of transmitting a PDF file to the image forming apparatus 20 by the recording medium 216 such as a universal serial bus (USB) memory connected to the image forming apparatus 20.

The communication unit 2300 of the image forming apparatus 20 receives the print request transmitted by the terminal 10. When starting receiving the PDF file included in the print request, the communication unit 2300 sequentially stores (buffers) the received PDF file as a buffer in the RAM 203. The image forming apparatus 20 continues the following printing process without waiting for completion of the buffering.

The communication unit 2300 transmits a print start notification to the page data generating unit 2210 to start printing (step S12).

Upon receiving the print start notification, the page data generating unit 2210 determines whether it is possible to generate a plurality of divided PDF files each of which is corresponding to one of the plurality of pages based on the received buffer stored in the RAM 203 (step S13). The plurality of divided PDF files each of which is corresponding to one of the plurality of pages are obtained by dividing the data of the plurality of pages to be printed based on the PDF file including the plurality of pages included in the print request. For example, when the number of pages included in the PDF file included in the print request is ten and all the pages are to be printed, ten divided PDF files each of which is corresponding to one of the ten pages are generated. Hereinafter, the plurality of divided PDF files each of which is corresponding to one of the plurality of pages is expressed as divided files.

Figure 6:
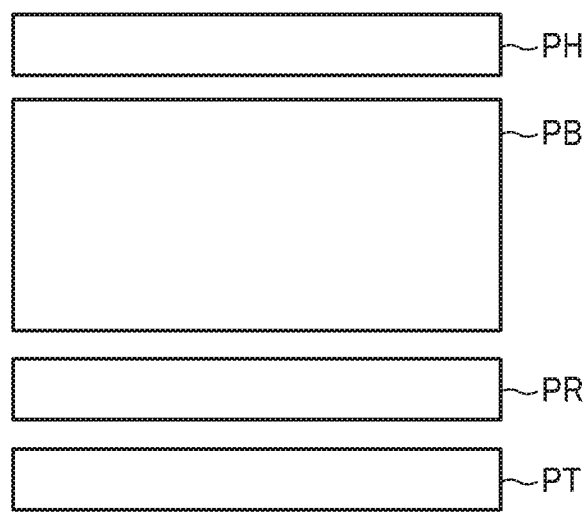
FIG. 6 is a conceptual diagram illustrating an example of a structure of a PDF file, according to one of the embodiments of the present disclosure.

To explain regarding whether a PDF file is dividable to generate divided files to generate divided files, a structure of the PDF file is described below FIG. 6 is conceptual diagram illustrating an example of a structure of a PDF file. In compliance with an open standard managed by the International Organization for Standardization (ISO), the PDF file has a header PH, a body PB, a cross-reference table PR (an example of position information), and a trailer PT in order from the top.

The header PH includes PDF version information and the like.

In the body PB, a document catalog, page information, object information of each page, and the like are defined for an object number. The object number is an identifier of an object. The object number, which is the identifier of the object, is an arrangement of, for example, a reference number (x), a generation number (y), and "obj", and represented as "1 0 obj", for example. The document catalog is the root (top) of the object hierarchy. The page information includes a reference to object information of each page, and the like. The object information of each page includes data for rendering each page.

The cross-reference table PR includes address information (position information) of each object having the object number defined in the body PB. The address information is offset information indicating the number of bytes from the head of the header PH to the object. The image forming apparatus 20 identifies a position of an object by referring the cross-reference table PR and accesses the object.

The trailer PT includes address information (startxref) indicating a position of the cross-reference table PR, an object number (Root) of the document catalog, a reference (Info) to the date and time when the PDF file is generated, and the like.

Due to the structure of the PDF file, the image forming apparatus 20 accesses the document catalog by specifying the object number of the document catalog from the trailer PT and specifying the address information corresponding to this object number from the cross-reference table PR. In the normal operation of the image forming apparatus 20, the image processing related to the PDF file is started after reading up to the trailer PT of the PDF file.

A description is now given of a specific example of a process of determining whether the PDF file is dividable to generate divided files, which is performed in the above-described step of S13. FIGS. 7A to 7D are conceptual diagrams each illustrating a structure of a PDF file according to the present embodiment of the disclosure.

Hereinafter, the objects defining various information of a page is simply referred to as a page object. In the body PB of a PDF file, the page objects may be randomly arranged. On the other hand, in the PDF file according to the present embodiment as illustrated in FIG. 7A to FIG. 7D, the page objects are sequentially arranged in the body PB.

In the present embodiment, information purposely given for determining that page split can be performed, namely the PDF file is dividable to generate divided files, is referred to as "determination information". Additionally, information for specifying a position of data, such as an object, included in a predetermined page is referred to as "specifying information". The specifying information and the determination information may be common in some cases. A part of specifying information is referred to as "boundary information".

Figure 7A:
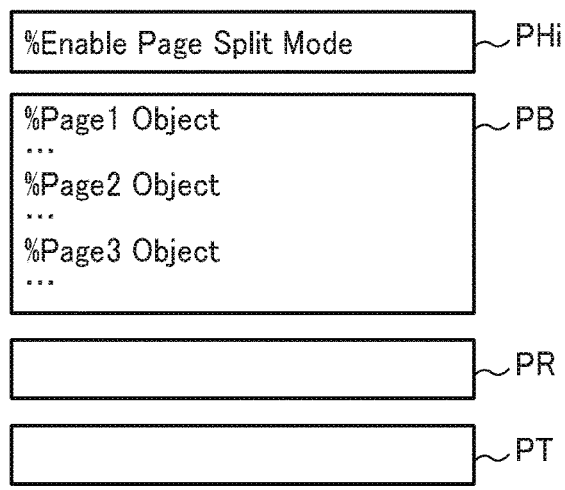
FIGS. 7A to 7D are conceptual diagrams each illustrating a structure of a PDF file, according to one of the embodiments of the present disclosure.
Figure 7B:
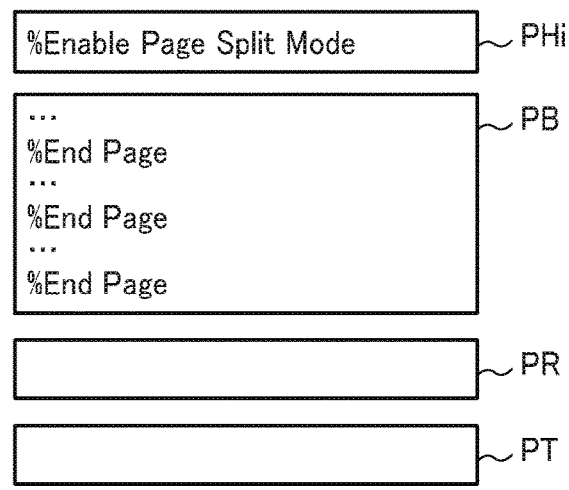

In the header PHi of the PDF file of each of FIG. 7A and FIG. 7B, "% Enable Page Split Mode" indicating that the PDF file is dividable to generate divided files is given as the determination information, which is used for determining whether the PDF file is dividable to generate divided files or not. In the body PB of the PDF file illustrated in each of FIGS. 7A and 7B, boundary information is given to a boundary of an area where each page object is recorded. In the PDF file of FIG. 7A, the boundary information of "%Page Object" is given in front of each page object, and in the PDF file of FIG. 7B, the boundary information of "%End Page" is given after each page object. Each of "%Page1 Object" and "%End Page" is determination information and specifying information. Each of "%Page1 Object" and "%End Page" is boundary information because being inserted between the pages. Namely, the boundary information is arranged between the pages arranged next to each other.

Figure 7C:
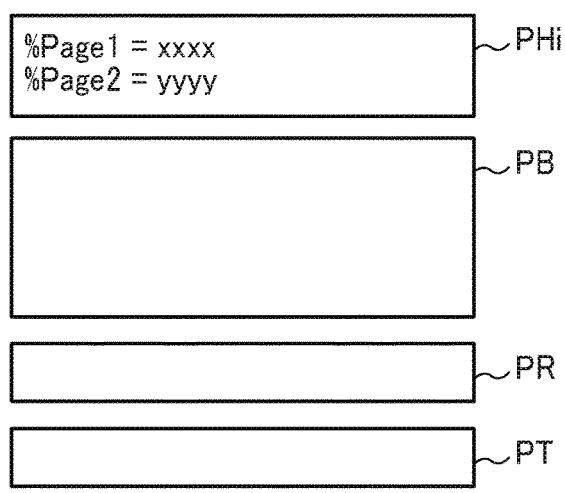

In the header PHi of the PDF file of FIG. 7C, as the determination information and the specifying information, address information of "%Page1=xxxx" and address information of "%Page1=yyyy" each indicating a position of each page object in the body PB are given as offset information.

Figure 7D:
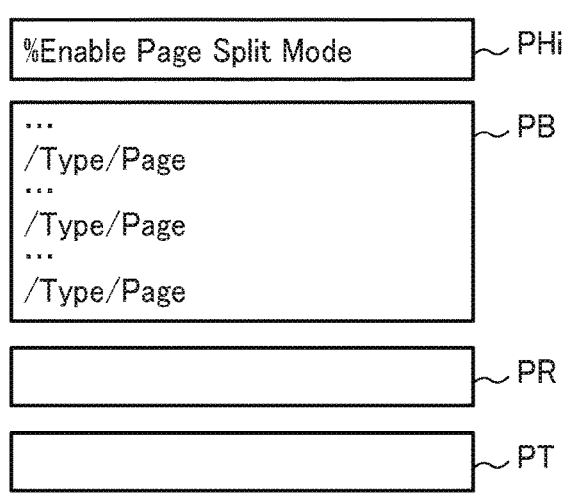

In the body PB of the PDF file illustrated in FIG. 7D, a command of "/Type/Page" conforming to the PDF language is arranged as the boundary information at the end of the area where each page object is recorded. Additionally, "/Type/Page" is also the specifying information for specifying a position of an object.

The page data generating unit 2210 can determine that the PDF file is dividable to generate divided files based on the determination information at a time of reading the header PHi in the receiving buffer without referring to the trailer PT of the PDF file.

When the determination of the above-described step of S13 indicates that the PDF file is not dividable to generate divided files, the page data generating unit 2210 waits until the reception of the PDF file transmitted from the terminal 10 is completed and stores the received entire buffer in the storage unit 2000 as the PDF file. Subsequently, the page data generating unit 2210 transmits the entire PDF file to the print data processing unit 2220 (step S14).

The print data processing unit 2220 analyzes the language of the received entire PDF file, namely parses the received entire PDF file, and generates a print image by rendering an image for each page in a frame memory while randomly accessing data for rendering each page. The print data processing unit 2220 transmits a print instruction including the print images to the plotter engine 211 to execute printing (step S15). When receiving the print instruction, the plotter engine 211 repeats an image forming process and a discharging process.

When the determination of the above-described step of S13 indicates that the PDF file is dividable to generate divided files, the page data generating unit 2210 generates a divided file for each page each time the page object included in the PDF file is received (step S21).

Figure 8:
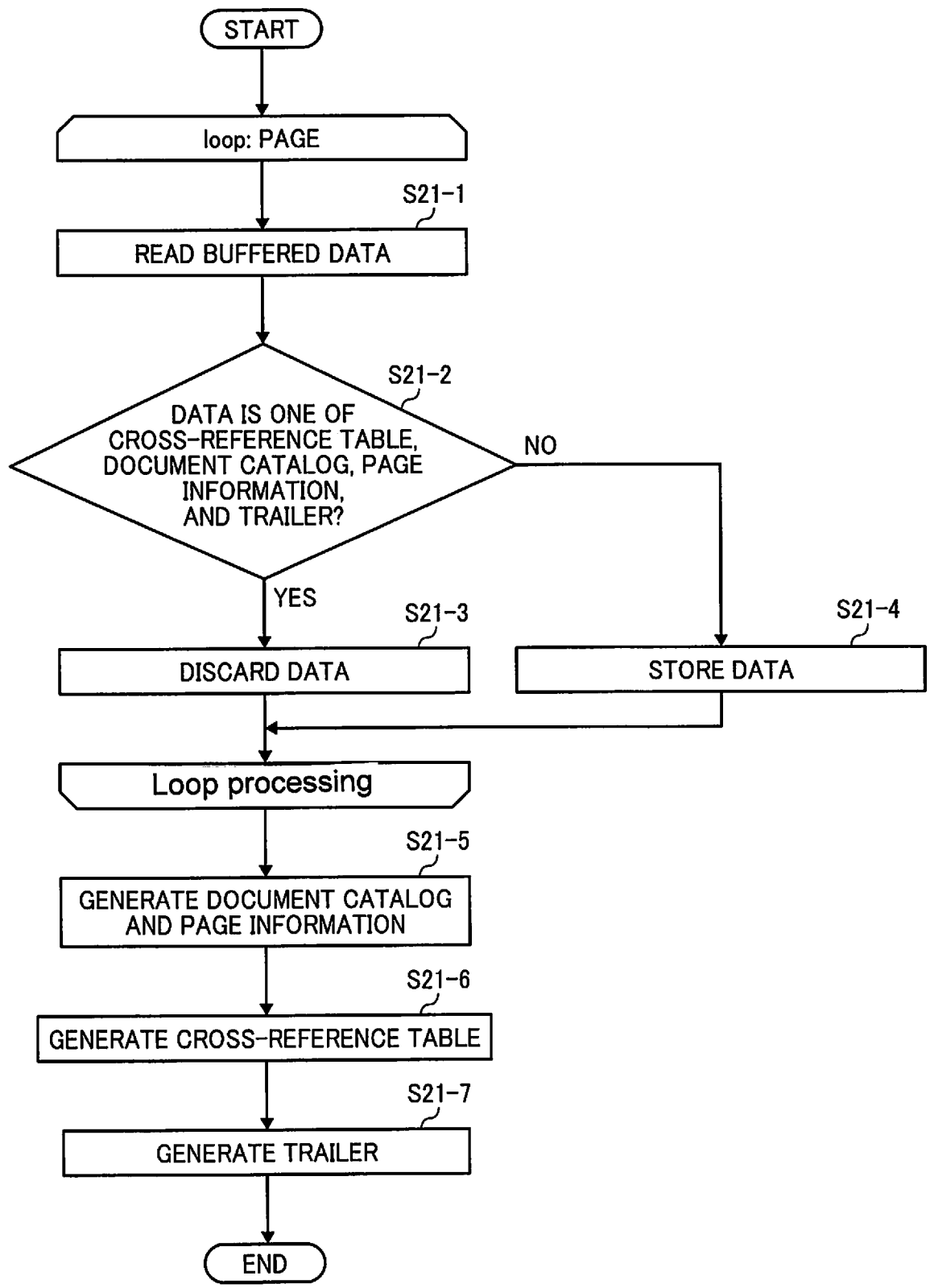
FIG. 8 is a flowchart illustrating an example of a process of generating divided files, according to one of the embodiments of the present disclosure.

FIG. 8 is a flowchart illustrating an example of a process of generating a divided file. A detailed description of a step of S21 in the printing process illustrated in FIG. 5 is described, with reference to FIG. 8. The step of S21 is executed without waiting for the completion of the reception of the PDF file transmitted from the terminal 10.

Figure 9A:
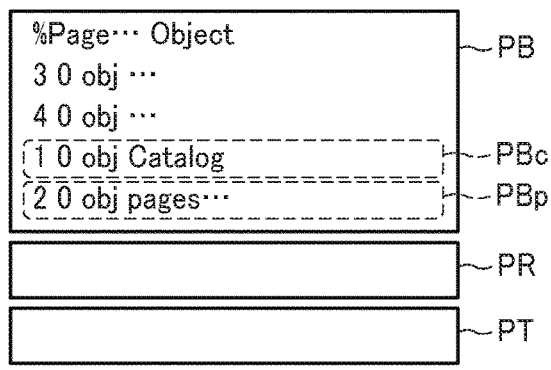
FIGS. 9A to 9E are conceptual diagrams each illustrating an example of a part of a structure of a PDF file, according to one of the embodiments of the present disclosure.

Parts of the PDF file received by the communication unit 2300 are sequentially stored in the RAM 203, as a record of a buffer. FIGS. 9A to 9D are conceptual diagrams each illustrating an example of a part of structure of the PDF file. FIG. 9A is a conceptual diagram illustrating a part of the PDF file stored as a buffer. The page data generating unit 2210 reads records of the buffered PDF file one by one (step S21-1). A record is defined as one item, and in FIGS. 9A to 9D, one row is corresponding to one record.

The page data generating unit 2210 determines whether the read record corresponds to one of the cross-reference table PR, the document catalog PBc, the page information PBp, and the trailer PT (step S21-2).

When a determination of the above-described step of S21-2 indicates that the read record corresponds to any one of the cross-reference table PR, the document catalog PBc, the page information PBp, and the trailer PT (YES in S21-2), the page data generating unit 2210 discards the read record (step S21-3). This is because each record of the cross-reference table PR, the document catalog PBc, the page information PBp, and the trailer PT is newly generated in a latter step of the process of generating a divided file, as described later.

When a determination of the above-described step of S21-2 indicates that the read record does not correspond to any one of the cross-reference table PR, the document catalog PBc, the page information PBp, or the trailer PT (NO in S21-2), the page data generating unit 2210 stores the read record in the storage unit 2000 (step S21-4).

The page data generating unit 2210 repeats the processing of the steps from S21-1 to S21-4 until all the records in one page are completely read, namely the page object is read (loop processing). The page data generating unit 2210 can determine whether or not the reading of the records of one page has been completed by reading the boundary information in the body PB (see FIG. 7A and FIG. 7B) or by reading the specifying information in the header (see FIG. 7C).

Figure 9B:
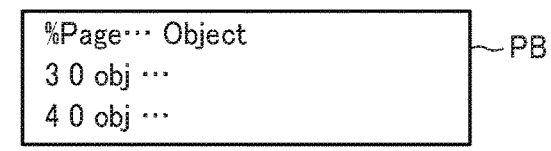

Upon completion of the above-described loop processing, among the records of one page extracted from the PDF file, the records, namely the page object, except for the cross-reference table PR, the document catalog PBc, the page information PBp, and the trailer PT, for rendering one page, are stored in the storage unit 2000. The page data generating unit 2210 sets the records stored in the storage unit 2000 as the body PB of the divided file. FIG. 9B is a conceptual diagram illustrating the body PB of the divided file generated after the loop processing.

The body PB illustrated in FIG. 9B does not include the cross-reference table PR, the document catalog PBc, the page information PBp, and the trailer PT, each of which is discard in the above-described step of S21-3. Therefore, even if the body PB illustrated in FIG. 9B is transmitted as the divided file to the print data processing unit 2220, the print data processing unit 2220 fails to execute the printing. Therefore, the page data generating unit 2210 adds required information to the body PB illustrated in FIG. 9B to complete a PDF file that complies with the PDF language specification.

The page data generating unit 2210 generates and adds a header PH to the head of the divided file being generated in the process of generating a divided file. The header PH to be added includes a fixed form such as PDF version information.

The page data generating unit 2210 generates page information Bp required for the print job in the divided file. A predetermined value is assigned as the object number of the page information. The page information includes the number of pages and a reference to each object for rendering a page. The divided file includes data for rendering one page so that the number of pages is one. Each reference to one of the objects is an object number of the corresponding object for rendering the page included in the divided file.

The page data generating unit 2210 generates the document catalog as job information required for the print job in the divided files. A predetermined value is assigned as the object number of the document catalog. The job information required for the print job includes the references to the objects of the page information. As described above, because the object number of each object of the page information is predetermined, the reference to the page information is a predetermined value.

Figure 9C:
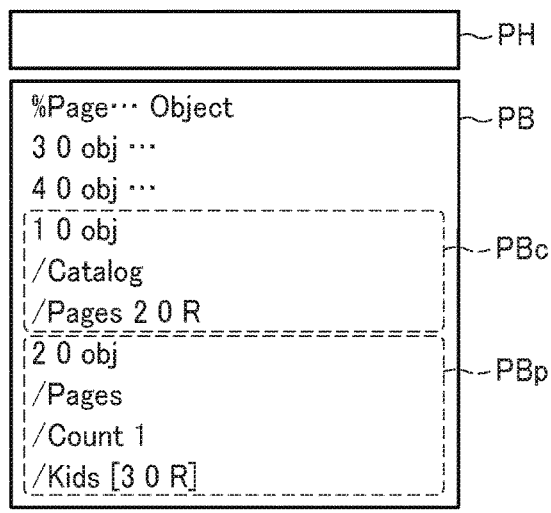

FIG. 9C is a conceptual diagram illustrating the divided file being generated in the process of generating a divided file. As illustrated in FIG. 9C, the page data generating unit 2210 adds the generated document catalog and page information to the rear end of the body PB (step S21-5).

Figure 9D:
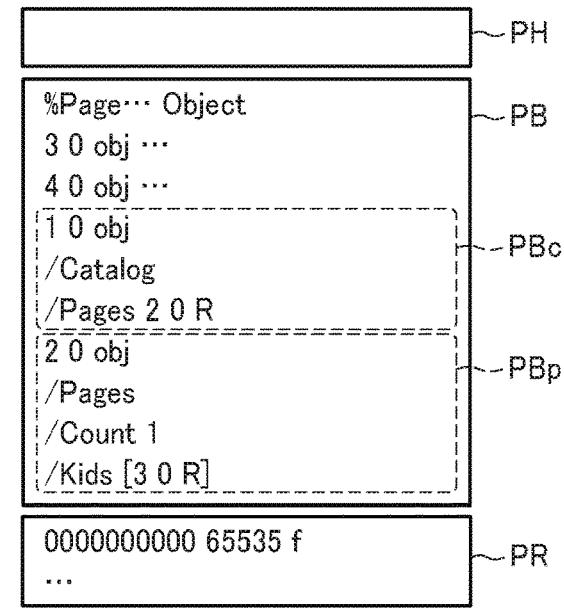

Subsequently, the page data generating unit 2210 generates and adds the cross-reference table PR after the body PB in the divided file being generated in the process of generating a divided file (step S21-6). The cross-reference table PR is address information indicating offset information which represents the position of each object in the body PB. The page data generating unit 2210 searches the objects in the previously generated body PB and describes the address information indicating the position of each of the objects as offset information to generate the cross-reference table PR. FIG. 9D is a conceptual diagram illustrating the divided file being generated in the process of generating a divided file and to which the header PH and the cross-reference table PR are added.

The page data generating unit 2210 generates the trailer in the divided file. The trailer includes a size of the cross-reference table PR and a reference to the document catalog. The size of the cross-reference table PR is calculated based on a result obtained by generating the cross-reference table PR in the above-described step of S21-6. For the reference to the document catalog, the predetermined object number of the document catalog is used.

Figure 9E:
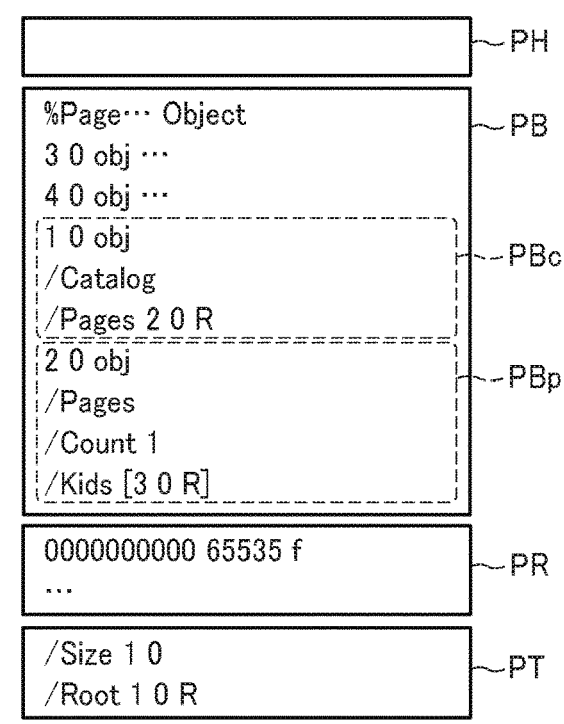

FIG. 9E is a conceptual diagram illustrating the divided file. As illustrated in FIG. 9E, the page data generating unit 2210 adds the generated trailer PT to the divided file, which is being generated in the process of generating a divided file after the cross-reference table PR, thereby completing the divided file which complies with the PDF language specification (step S21-7). The divided file same as or similar to the PDF illustrated in FIG. 9E is generated for the number of times corresponding to the number of pages.

The steps subsequent to the step of S21 in the process of FIG. 5 are described below. The page data generating unit 2210 transmits the generated divided file to the print data processing unit 2220 (step S22).

The print data processing unit 2220 analyzes the language of the received divided file, namely parses the received divided file, and generates a print image by rendering an image of one page in the frame memory while accessing each of the objects, namely the page object, for rendering the page. The print data processing unit 2220 transmits a print instruction including the print image to the plotter engine 211 to execute the printing (step S23). In response to the print instruction, the plotter engine 211 transfers the print image of one page on a sheet of paper and discharges the sheet of paper, namely the printed sheet.

The page data generating unit 2210 determines whether unprocessed page data for which a divided file has not been completed is included in the buffer among the data of the pages to be printed. When it is determined that the unprocessed page data is included in the buffer, the image forming apparatus 20 repeats the processing of the steps from S21 to S23. In this manner, by repeating the processing of the steps from S21 to S23, the divided files, each of which is for rendering the corresponding page, are generated, and the pages, each of which is corresponding to one of the divided files, are printed out one by one.

After completing printing all the pages to be printed, the page data generating unit 2210 deletes remaining data as the buffer (step S24). Accordingly, the capacity of one page is sufficient for the buffer because the communication unit 2300 stands by for reception of next data after the buffer is cleared.

FIGS. 10A to 10C are conceptual diagrams each illustrating a time required for the process of printing a PDF file (the whole printing process). In each of the diagrams of FIGS. 10A to 10C, the left end of the horizontal axis represents a time when the image forming apparatus 20 starts receiving a PDF file, and as it goes to the right with respect to the horizontal axis, the time passes from the start of receiving the PDF file. The process of printing a PDF file, namely the whole printing process, includes a spooling process in which the PDF file is received and buffered, a parsing process in which the PDF file is parsed, a rendering process in which an image of the PDF file is formed, and a printing/discharging process in which the image is printed out.

FIG. 10A is a conceptual diagram illustrating the time required for performing each process in receiving and printing a PDF file including a plurality of pages. When the PDF file including the plurality of pages is printed out, the spooling process of the PDF is a bottleneck in the whole printing process.

For example, when the spooling process takes 0.1 seconds to spool a PDF file of a single page of 100 kilobytes, spooling a PDF file of 1000 pages of 100 megabytes (MB) requires 100 (=0.1*1000) seconds. Therefore, after 100 seconds, the parsing process performed on the first page is started. If the processing speed of the image forming apparatus 20 is 50 parts per million (PPM), the image forming apparatus 20 takes 1200 seconds to print 1000 pages. The time start from the spooling process to completion of the printing/discharging process, namely the time required to complete the entire job, is 1300 seconds (=100+1200).

Further, in this case, the image forming apparatus 20 requires a storage having a size of at least 100 MB for buffering. An image forming apparatus that does not have a storage having a size of 100 MB is unable to perform the spooling process, and accordingly, the print job is canceled.

FIG. 10B is a conceptual diagram illustrating the time required for performing each process in receiving and printing a linearized PDF file including a plurality of pages. In printing a linearized PDF file, the image forming apparatus 20 can specify data for rendering the first page before reading the entire PDF file and perform printing of the first page after the completion of the spooling process of the data of the first page. However, the image forming apparatus 20 is unable to specify data for rendering each of the pages after the first page and accordingly, fails to start the printing of the rest part of the PDF file until reading the rest part of the PDF file. Thus, the spooling process of the rest part of the PDF file is a bottleneck in the whole printing process. As a result, a lot of time is required to complete performing the whole printing process on the PDF file.

FIG. 10C is a conceptual diagram illustrating the time required for performing each process in printing multiple PDF files each of which is corresponding to one page. When the multiple PDF files each of which corresponds to one page are printed, a time required for the spooling process of the PDF files is short and the spooling process is not a bottleneck, resulting in shortening the time required for the whole printing process.

For example, when 1000 PDF files, each of which is a 100 kB of page, are to be printed, the image forming apparatus 20 can continuously perform printing after receiving a PDF file of the first page and performing the spooling process on the PDF file of the first page. When the image forming apparatus 20 that has a 50 PPM processing speed requires 0.1 second for the spooling process of the PDF file of the first page and requires 1200 seconds to print images of 1000 PDF files, the time required for the entire print job is 1200.1 seconds.

Further, the image forming apparatus 20 is able to execute the print job as long as the image forming apparatus 20 has a storage having a size of at least 100 kB. That is, even when a capacity of the storage of the image forming apparatus 20 is small, a print job is hardly canceled or the number of cancelling a print job becomes low.

Modification a of Example Embodiment

A description is given now of a modification A of the above-described example embodiment (first embodiment). In particular, difference from the example embodiment described above is focused. In the modification A, the determination information for specifying whether the PDF file is dividable to generate divided files or not is not assigned to a header of a PDF file. For example, when a document is read by a scanner, the determination information is not given, in general. However, as described below, even when the determination information is not given, the PDF file is dividable to generate divided files.

Figure 11:
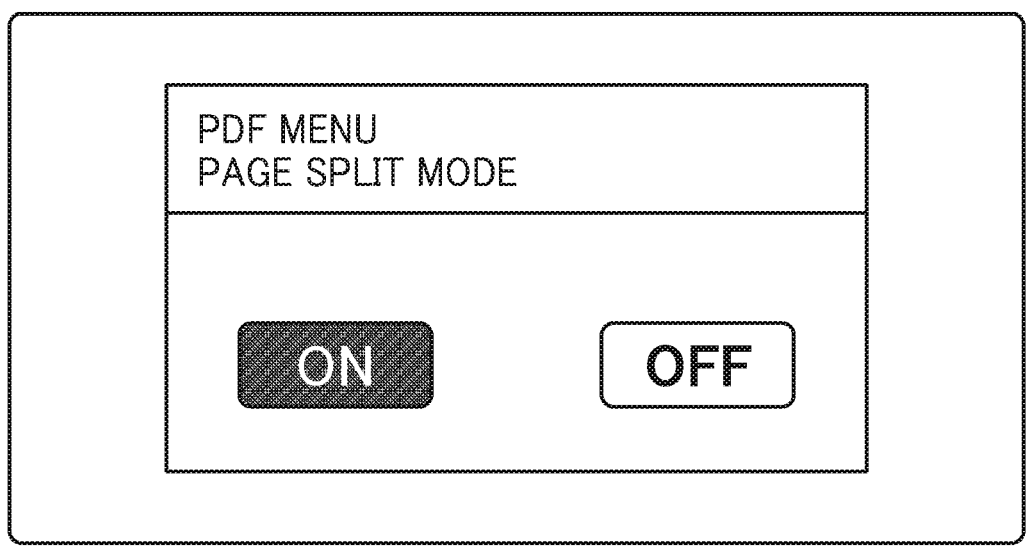
FIG. 11 is an example of a reception screen concerning a page split mode, according to one of the embodiments of the present disclosure.

FIG. 11 is an example of a reception screen concerning a page split mode, according to the modification A of the example embodiment. The image forming apparatus 20 causes the display on the control panel 212 to display a reception screen illustrated in FIG. 11 and receives input from the user for shifting to the page split mode. The page split mode is a mode in which divided files are automatically generated from a PDF file including a plurality of pages and then printed out the PDF file including the divided files.

Figure 12A:
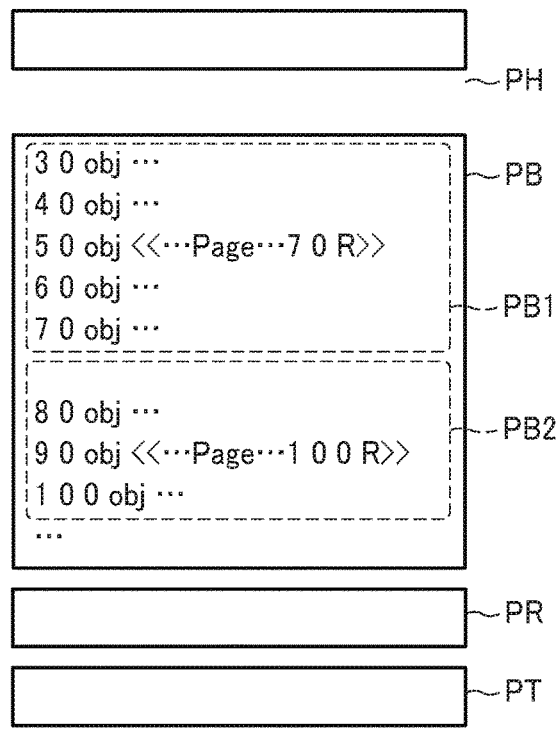
FIGS. 12A and 12B are conceptual diagrams each illustrating an example of a structure of a PDF file, according to one of the embodiments of the present disclosure.
Figure 12B:
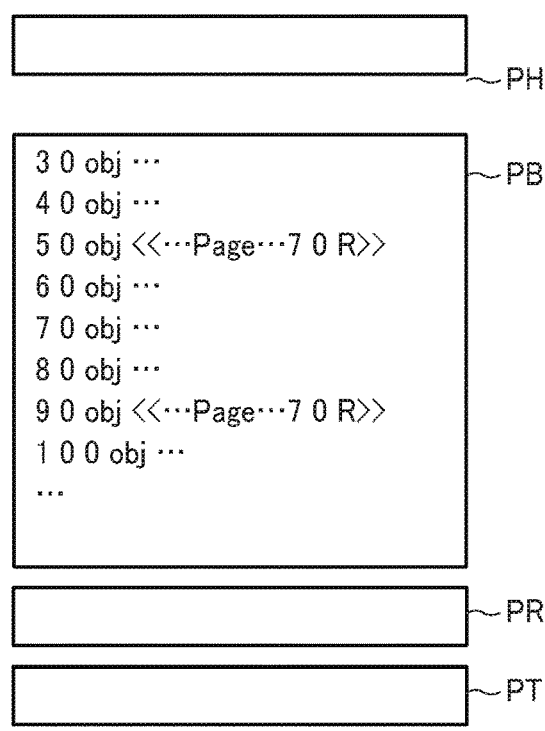

FIGS. 12A and 12B are conceptual diagrams each illustrating an example of a structure of a PDF file. FIG. 12A is an example of a structure of a PDF file that is dividable to generate divided files. As illustrated in FIG. 12A, a body PB of the PDF file includes object numbers of reference destinations as page information. In the example of FIG. 12A, the objects up to the object of reference destination of "70 obj" can be regarded as a page object PB1 corresponding to a certain page and the objects from an object arranged right after the page object PB1 can be regarded as one of the objects included in a page object PB2.

FIG. 12B is an example of a structure of a PDF file that is not dividable to generate divided files. An arrangement in a body PB of the PDF file does not need to be sequential. Accordingly, a preceding object may be referred as the page information, as illustrated in FIG. 12B. In the example of FIG. 12B, if the preceding object is processed as an object of a previous page and does not remain as a record of the buffer, the image forming apparatus 20 fails to access the object of reference destination. Therefore, in general, when there is a page referring to the preceding object, a determination indicating that the PDF file is not dividable to generate divided files may be made. Additionally, when there is no preceding object in the buffer when the buffer is searched, a determination indicating that the PDF file is not dividable to generate divided files may be made. Further, a determination indicating that the PDF file is not dividable to generate divided files may be made when an object of a predetermined page is arranged after the data of the predetermined page, and is to be referred later.

Figure 13:
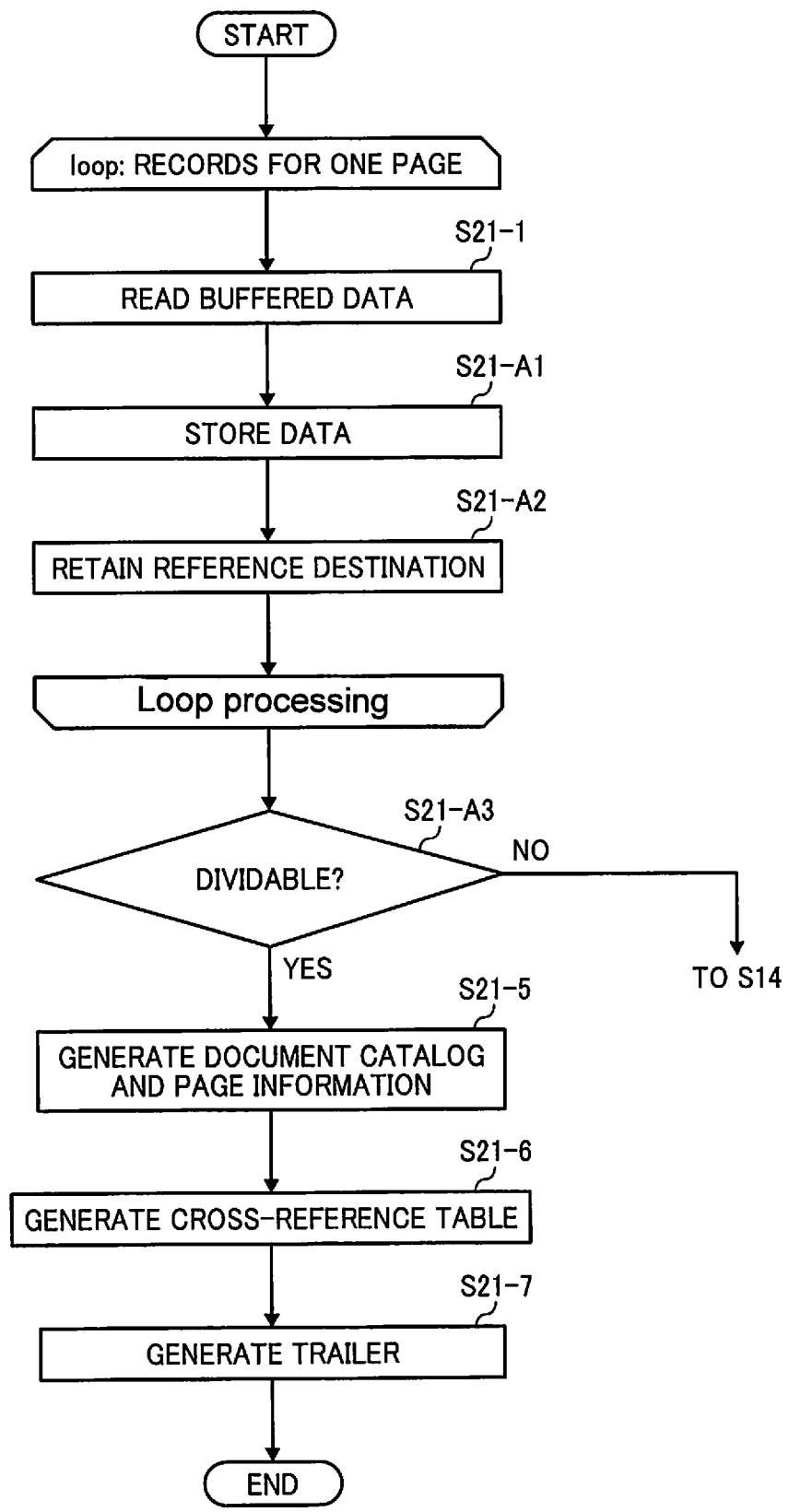
FIG. 13 is a flowchart illustrating a process of generating a divided file, according to a modification A of an example embodiment of the present disclosure.

Accordingly, the page data generating unit 2210 of the image forming apparatus 20 is able to determine whether the PDF file is dividable to generate divided files while reading buffered data, even when the determination information is not included in the PDF file. FIG. 13 is a flowchart illustrating a process of generating a divided file according to the modification A of the example embodiment. In FIG. 13, the same reference numerals are given to the same steps in the process of FIG. 8, and the description of the same steps is omitted below.

The page data generating unit 2210 stores a record read in the step of S21-1 in the storage unit 2000 without discarding any data (step S21-A1).

When the record read in the step of S21-1 includes an object number of a reference destination, for example "7 0 R" in FIG. 12A, the page data generating unit 2210 retains the object number of the reference destination (step S21-A2).

The page data generating unit 2210 repeatedly analyzes the buffer of the read PDF file and determines that the objects arranged up to an object having the object number of the retained reference destination are the objects of one page, namely a page object. When there is not such a structure as illustrated in FIG. 12B in a range read by the page data generating unit 2210, the page data generating unit 2210 determines that the PDF file is dividable to generate divided files (YES in step S21-A3), and generates a divided file based on objects for rendering a page among the read records to execute the printing. Processing of generating a divided file and printing divided files is the same as that described in the example embodiment above.

When the read file includes a structure as illustrated in FIG. 12B, the page data generating unit 2210 determines that the PDF file is not dividable to generate divided files (NO in S21-A3). In this case, the image forming apparatus 20 cancels the print job or waits until the entire PDF file is received and then executes the printing by using the PDF file stored as a buffer in the storage unit 2000. The process is the same as the above-described step of S14 in the above-described embodiment. Therefore, when the determination indicating that the PDF file is not dividable to generate divided files is made in processing a page among the pages after processing the first page, the printing is stopped once and can be resumed (be continued) using the file stored in the storage unit. In this case, the printing is resumed from the page that has not been printed out.

Even when the read PDF file includes a structure as illustrated in FIG. 12B, the page data generating unit 2210 may continue the process to generate divided files by adding the object of reference destination remaining in the storage unit 2000 to generate a divided file, as long as the object of reference destination remains in the storage unit 2000.

Modification B of Example Embodiment

Figure 14:
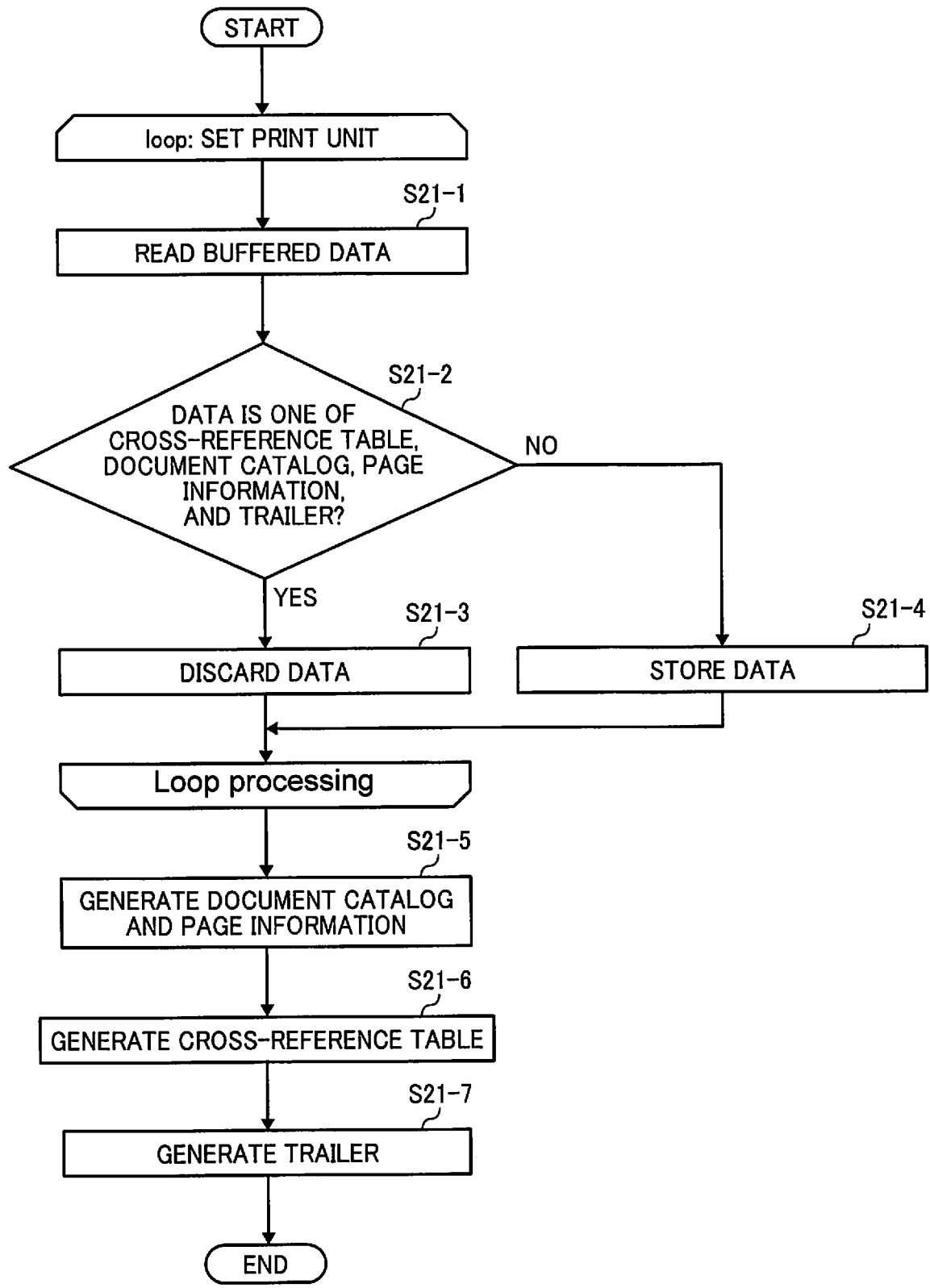
FIG. 14 is a flowchart illustrating an example of a process of printing an image, according to a modification B of an example embodiment of the present disclosure.

A description is now given of a modification B of the example embodiment. In particular, difference from the example embodiment described above is focused. FIG. 14 is a flowchart illustrating an example of a process of printing an image according to the modification B of the example embodiment. In FIG. 14, the same reference numerals are given to the same steps in the process of FIG. 8, and the description of the same steps is omitted below.

In the modification B of the example embodiment, the image forming apparatus 20 repeats loop processing of the steps from S21-1 to S21-4 for each of print units, which is set (set print unit). The set print unit is included in the print request transmitted from the terminal 10 to the image forming apparatus 20. For example, when pages to be printed by the image forming apparatus 20 is set to the first page and the third page, the image forming apparatus 20 repeats the loop processing on the objects of the first page and the objects of the third page in the PDF file, while skipping the objects of the second page. In this case, for example, if the PDF file received by the image forming apparatus 20 is the PDF file as illustrated in FIG. 7A, the loop processing is performed on the objects arranged after "%Page1 Object". Then the objects arranged after "%Page2 Object" is skipped and the loop processing is performed on the objects arranged after "%Page3 Object".

Additionally, for example, in the image forming apparatus 20, 2-in-1 is set for the printing, that is, 2 pages on one sheet is set to print setup, the page data generating unit 2210 generates a PDF file (divided file) including content of the first and the second pages and another PDF file (divided file) including content of the third page. That is, the page data generating unit 2210 generates the PDF file (divided file) based on the objects arranged after "Page1 Object" and the objects arranged after "Page2 Object", and the other PDF file (divided file) based on the objects arranged after "%Page3 Object".

That is, "divided files" is not limited to a case of "one page=one file (one divided file)" or a case of "the number of files=the number of pages". In the case of 2-in-1, namely two pages=one file (one divided file), the number of files matches the number of times of performing the parsing process and the rendering process (the number of sheets). Additionally, when a page to be printed is designated, it is more efficient to generate only the PDF file (divided file) corresponding to the page designated. The page data generating unit 2210 generates one file including one or more pages to be printed out (with one side). In other words, the divided file includes pages of the determined number of pages.

Further, the page data generating unit 2210 may determine the number of pages included in a divided file as the number of pages for both sides. Alternatively, the page data generating unit 2210 may determine the number of pages included in a divided file as one page in a case of intensive printing (for example, in a case of setup of A4 portrait of 2-in-1, since the image on one sheet is divided vertically, the two images are rendered individually in corresponding one of the areas, in parallel).

Figure 15:
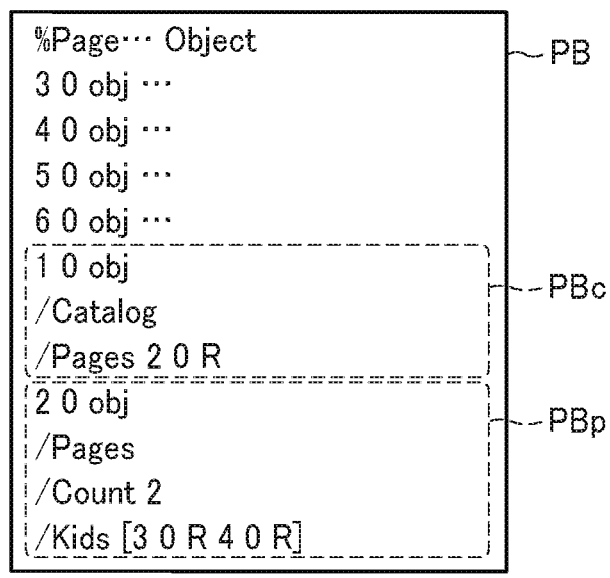
FIG. 15 is a conceptual diagram illustrating an example of page information generated in the modification B of the example embodiment of the present disclosure.

FIG. 15 is a conceptual diagram illustrating an example of the page information generated in the modification B of the example embodiment. In S21-6, the page data generating unit 2210 generates the page information PBp required for the print job of the divided file. The page information includes the number of pages and a reference to the objects for rendering a page. In a print setup of 2-in-1 (intensive printing), the number of pages in a PDF file (divided file) that is obtained by dividing the data for each two pages is two. Additionally, as a reference to the objects, an object number in accordance with two pages are recorded, according to the setup.

Modification C of Example Embodiment

A description is now given of a modification C of the example embodiment. In particular, difference from the above-described example embodiment is focused. In the following description of the modification C, a method of generating a PDF file according the present embodiment is described. When a document is read by a scanner, the determination information is not given, in general, as described above. Although it is possible to determine whether the PDF file is dividable to generate divided files even when the determination information is not given, as described with reference to FIG. 12 and FIG. 13, the determination information still allows the assured determination.

Figure 16:
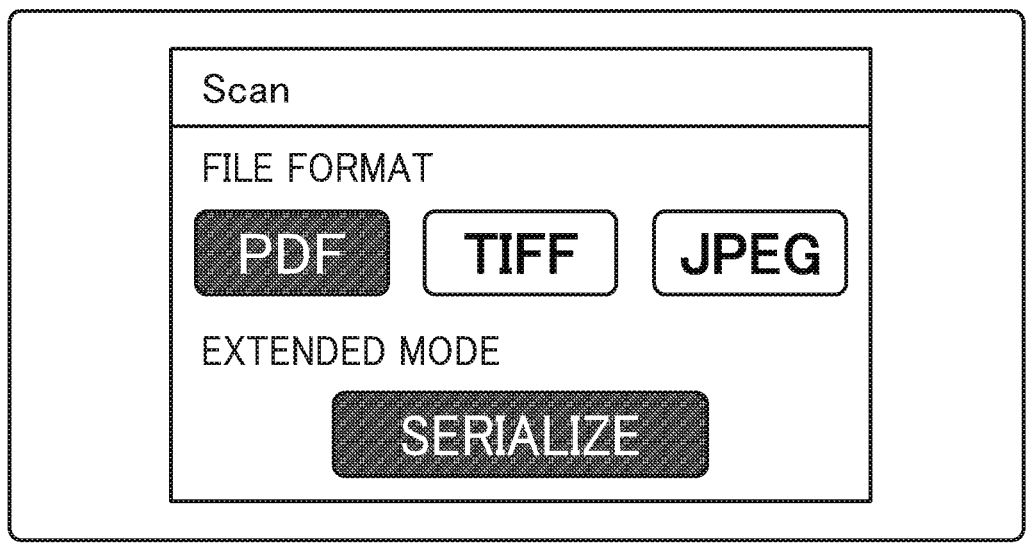
FIG. 16 is an example of a reception screen for receiving an input for shifting a mode for generating a PDF file that is dividable to generate divided files and includes the specifying information, according to one of the embodiments of the disclosure.

FIG. 16 is an example of a reception screen for receiving an input for shifting to a mode for generating a PDF file that is dividable to generate divided files, according to the present embodiment of the disclosure. The image forming apparatus 20 causes the display on the control panel 212 to display the reception screen illustrated in FIG. 16 and receives an input from the user for shifting to a mode for generating a PDF file that is dividable to generate divided files.

Figure 17:
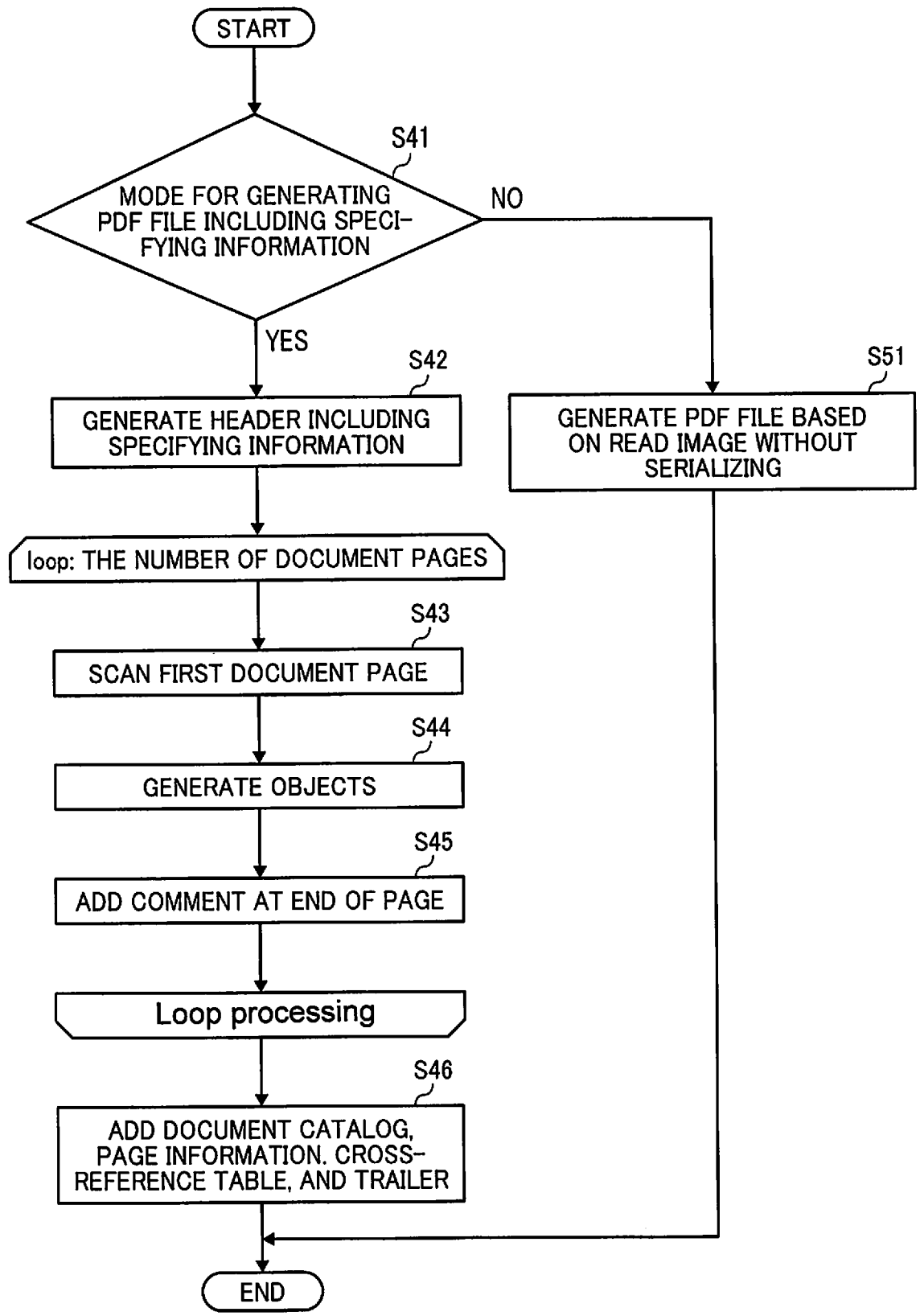
FIG. 17 is a flowchart illustrating a process of generating a PDF file, according to one of the embodiments of the disclosure.

FIG. 17 is a flowchart illustrating an example of the process of generating a PDF file, according to the embodiment. When a document provided by the ADF is read by the scanner in the image forming apparatus 20, the image generating unit 2120 determines whether the mode for generating the PDF file that is dividable to generate divided files is set or not (step S41).

When a determination of the step of S41 indicates YES, the image generating unit 2120 generates a header PHi of the PDF file including the determination information of "%

Enable Page Split Mode", which is determined in advance (step S42). FIGS. 18A to 18E are conceptual diagrams illustrating an example of a structure of the PDF file. FIG. 18A is a conceptual diagram illustrating a header PHi of the PDF file including the determination information.

Subsequently, the image forming apparatus 20 repeats the subsequent loop processing for the number of pages (sheets) in the document (hereinafter, pages in the document are referred to as document pages). In the loop processing, firstly, the reading unit 2110 scans and reads an image of the first original document page provided by the ADF (step S43).

Based on the image read in the step of S43, the image generating unit 2120 generates objects for rendering the page in accordance with the PDF language (step S44). The generated objects are added as a body PB after the header PHi generated in the step of S42. FIG. 18B is a conceptual diagram illustrating the PDF file that is being generated in the process of generating a PDF file after the objects for rendering a page are added.

The image generating unit 2120 adds a predetermined comment of "%End Page" as the boundary information to the rear end of the body (step S45). FIG. 18C is a conceptual diagram illustrating the PDF file that is being generated in the process, to which the comment is added at the end of the page. Additionally, the image generating unit 2120 may generate a body by rearranging the objects in a manner that a specific object, for example, (/Page), of the objects of page object is arranged at the end of the objects of page object and the arrangement is in a page order.

The image forming apparatus 20 repeats the processing of the steps from S43 to S45 for each document page. In step S44, the image generating unit 2120 adds objects for rendering a page that is newly read, after the comment of "%End Page". FIG. 18D is a conceptual diagram illustrating the PDF file that is being generated in the process, after repeating the loop processing two times.

Upon completing the loop processing for all the document pages, the image forming apparatus 20 adds the document catalog PBc, the page information PBp, the cross-reference table PR, and the trailer PT to the generated PDF file (step S46). The method of adding these pieces of information is the same as the processing of the steps from S21-5 to S21-7, and the description thereof is omitted. Upon completion of the processing of the step of S46, the PDF file, according to the embodiment, which is dividable to generate divided files, is completely generated (see FIG. 18E).

On the other hand, when a determination of the step of S41 indicates that the mode is not the mode for generating a PDF file that is dividable to generate divided files, the image forming apparatus 20 generates a PDF file based on an image read by the scanner, by a known method without serializing (step S51).

Second Embodiment

As described above with reference to, for example, FIG. 7A, whether a PDF file is dividable to generate divided files is determined using the determination information. However, there is a case where the print data processing unit 2220 is not able to perform the printing on a "file that is dividable to generate divided files". A description is now give of a case where printing is failed to be performed on a PDF file that is dividable to generate divided files, with reference to FIG. 19A and FIG. 19B.

FIG. 19A and FIG. 19B are conceptual diagrams each illustrating a PDF file that includes the determination information. In the PDF file illustrated in FIG. 19A, the determination information is included in the header PH, and the body PB is divided for each page. There may be a case where, after the PDF file that is "dividable to generate divided files" is generated, the user manually modifies the PDF file while leaving the determination information as it is, or edits the PDF file using an application, and then, saves the PDF file.

FIG. 19B is a conceptual diagram illustrating an example of the PDF file (file that is dividable to generate divided files") that is modified or edited. An object in the objects PB2 of a page illustrated in FIG. 19B refers to an object in another page. In the example of FIG. 19B, an object number 301 of "...4 0 R..." is the object number of reference destination. Because the object number 301 of "...4 0 R..." is identifying one of the objects of another page as seen from the objects PB2, the printing the divided files may not be proceed.

In this case, the print data processing unit 2220 "fails to perform processing on the data" in performing the parsing process or the rendering process. In this case, the objects PB1 is printed out, but an error occurs in printing the objects PB2, for example.

When determination indicating that the printing is failed to be performed, the print data processing unit 2220 performs printing from a page that is not previously printed out to prevent the error from occurring, or to prevent the print job from stopping when the error occurs, effectively. A detailed description of this is given below, with reference to FIG. 20.

Figure 20:
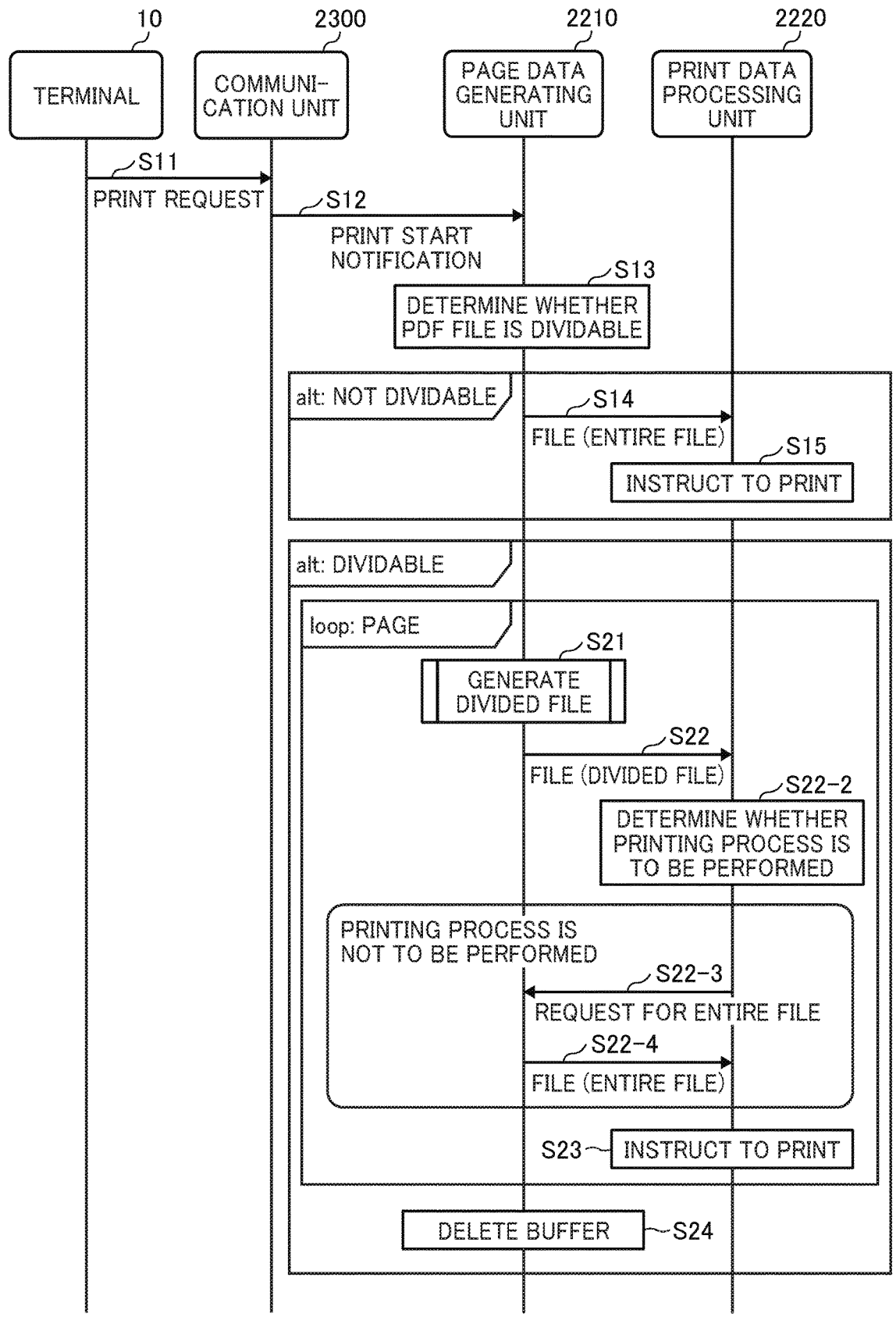
FIG. 20 is a sequence diagram illustrating an example of a process of printing an image (printing process), according to one of the embodiments of the disclosure.

FIG. 20 is a sequence diagram illustrating an example of a process of printing an image (printing process) according to the present embodiment of the disclosure. In the following description on FIG. 20, the difference from FIG. 5 is focused. The steps S11 to S22 in the process may be substantially the same as that in the process illustrated in FIG. 5.

In step S22-2, the print data processing unit 2220 determines whether the printing process can be performed on the divided files. How to determine whether the printing process can be performed on the divided files is, for example, as described above with reference to FIG. 19, determining whether or not an object in a page refers to a different page. In the example of FIG. 20, a determination in step S22-2 indicates that the printing process is failed to be performed.

In step S22-3, the print data processing unit 2220 requests the page data generating unit 2210 for the entire file. That is, the print data processing unit 2220 requests the PDF from which the divided files are not yet generated. When the print data processing unit 2220 determines that printing process is failed to be performed, the print data processing unit 2220 performs the printing/discharging process on pages until determining the printing process is failed to be performed and then cancels the printing process. It should be noted that the print data processing unit 2220 records the page on which the printing/discharging process is performed last.

In step S22-4, the page data generating unit 2210 transmits the entire PDF file from which the divided files are not yet generated to the print data processing unit 2220. The subsequent steps may be the same as that in FIG. 5. However, the print data processing unit 2220 resumes (continues) the printing from the page on which the printing process is not previously performed without performing the printing the pages on which the printing process is previously performed.

Therefore, the communication system 1 according to the present embodiment can print a page on which the printing process is not previously performed using the PDF file from which the divided files are not yet generated, when the divided files is failed to be printed out. Consequently, even after the divided files are generated and then modified or edited while the determination information is left, the printing process that is intended by the user can be completed.

Third Embodiment

In the description above with reference to FIG. 10C, the time required for performing each process in printing multiple PDF files each of which is corresponding to one page is reduced. A description is now given of an image forming apparatus according to a third embodiment. In the third embodiment, the image forming apparatus 20 having the CPU 201 that is a multi-core performs the spooling process, and the parsing/rendering process in parallel. In the description of the present embodiment, "parsing/rendering process" means one of the parsing process and the rendering process. Although, the parsing process and the rendering process are not processed in parallel in the following description, these processes may be processed in parallel.

Figure 21:
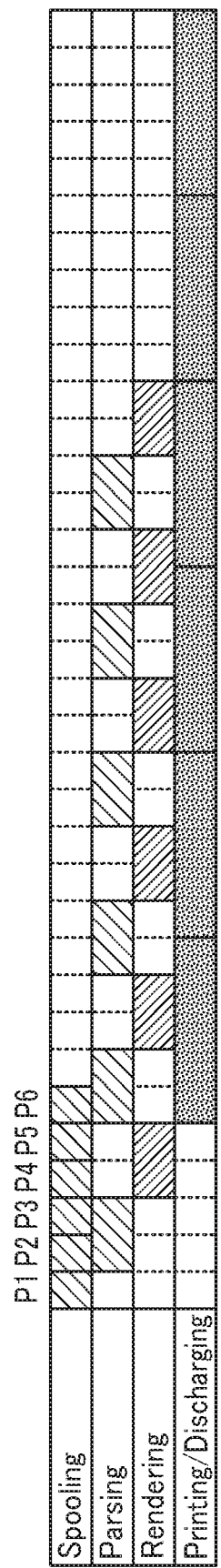
FIG. 21 is a timing chart illustrating an example of the time required for printing a PDF file in which a spooling process and a parsing/rendering process are performed in parallel, according to one of the embodiments of the disclosure.

FIG. 21 is a timing chart illustrating an example of the time required for printing a PDF file in which the spooling process and the parsing/rendering process are performed in parallel. In FIG. 21, the spooling process, the parsing process, the rendering process, and the printing/discharging process in the longitudinal direction is illustrated in relation to the time. One cell corresponds to time required for processing for one page.

In FIG. 21, the spooling process is performed asynchronously with the parsing process/rendering process. That is, the spooling process and the parsing/rendering process are performed in the same time zone. With the multi-core configuration, the CPU 201 can perform the spooling process and the parsing/rendering process in parallel. On the other hand, a single CPU fails to perform the spooling process and the parsing/rendering process in parallel, and thus, the spooling process and the parsing/rendering process illustrated in FIG. 10C are not performed in parallel. Therefore, by using the multi-core as in the embodiment, it is possible to further shorten the time required for printing a PDF file than that in FIG. 10C.

However, in the spooling process performed in parallel with the parsing/rendering process as illustrate in FIG. 21, the pages of PDF file are not spooled one by one, and accordingly the image forming apparatus 20 is required to temporarily store the entire divided files. That is, the storage unit, for example, the RAM 203 or the HDD 205, required to have a storage capacity to store the entire divided files.

Accordingly, it is effective that the print data processing unit 2220 determines an upper limit number of pages of the "divided files" to be stored temporarily in the storage unit, according to an available capacity of the storage unit and a status of the available CPU core. That is, the upper limit number of pages of the "divided files" to be stored temporarily is determined according to the available capacity of the storage unit and the status of the available CPU core. The print data processing unit 2220 refers to a spooled page number determination table such as Table 1 and determines the upper limit number of pages of the "divided files" to be stored temporarily.

TABLE 1

|  | 1 core | 2 cores | 3 cores |
|---|---|---|---|
| Available Capacity A byte | 1 page | 2 pages | 3 pages |
| Available Capacity B byte | 2 pages | 3 pages | 4 pages |
| Available Capacity C byte | 3 pages | 4 pages | 5 pages |

Table 1 is an example of the spooled page number determination table. In the spooled page number determination table, the upper limit number of pages of the "divided files" to be stored temporarily is set correspondingly to the number of available CPU cores and an available capacity of the storage unit. The larger the number of available cores and the larger the available capacity are, the larger the upper limit number of pages becomes. The number of available CPU cores and the available capacity of the storage unit can be detected by transmitting an inquiry from the print data processing unit 2220 to the operating system (OS) of the image forming apparatus 20, for example.

Figure 22:
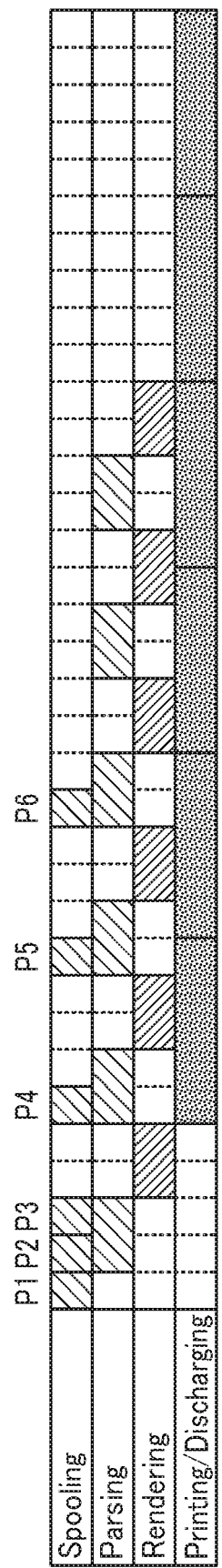
FIG. 22 is a timing chart illustrating an example of the time required for printing a PDF file, in a case where three pages is determined as the upper limit number of pages.

FIG. 22 is a timing chart illustrating an example of the time required for printing a PDF file, in a case where three pages is determined as the upper limit number of pages of the "divided files" to be stored temporarily, according to the present embodiment. Three pages is determined as the upper limit number of pages of the "divided files" to be stored temporarily, and accordingly, the print data processing unit 2220 temporarily stores pages from P1 to P3. When the parsing process and the rendering process performed on the page P1 are completed, the page P1, which is temporarily stored, can be deleted, and then the print data processing unit 2220 spools a page P4. The same applies after the page P4, namely from a page P5. When the parsing process and the rendering process performed on the page P2 are completed, the page P5 is spooled, and when the parsing process and rendering process performed on the page P3 are completed, the spooling process is performed on a page P6.

Figure 23:
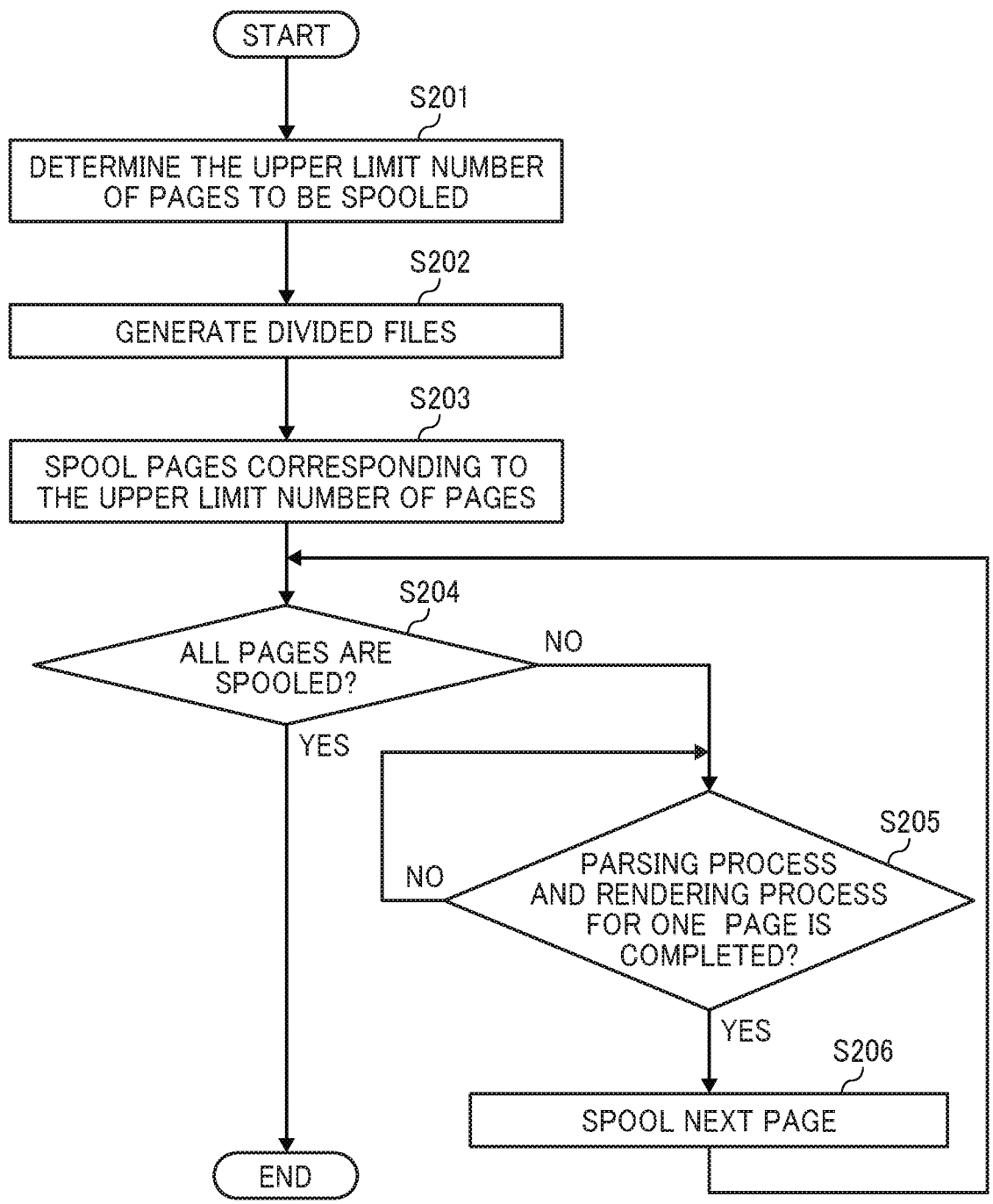
FIG. 23 is a flowchart illustrating an example of a spooling process performed by a print data processing unit, according to one of the embodiments of the disclosure.

FIG. 23 is a flowchart illustrating an example of the spooling process performed by the print data processing unit 2220, according to the present embodiment. The process of FIG. 23 starts when the divided files are generated.

First, the page data generating unit 2210 refers to the spooled page number determination table and determines the upper limit number of pages to be spooled according to the number of available CPU cores and the available capacity of the storage unit (step S201).

The page data generating unit 2210 generates divided files including the pages corresponding to the upper limit number of pages determined in S201 (step S202).

Subsequently, the page data generating unit 2210 spools the divided files generated in S202 (step S203).

Then, the page data generating unit 2210 determines whether or not all the pages of the divided files have been spooled (step S204). When a result of the determination of S204 is Yes, the process of FIG. 23 is completed.

When a result of the determination in S204 is No, the print data processing unit 2220 determines whether the parsing process and the rendering process have been performed on a spooled page corresponding to one page (step S205). The print data processing unit 2220 waits until the parsing process and the rendering process are performed on the spooled page corresponding to one page.

When the parsing process and the rendering process performed on the spooled page corresponding to one page are completed (Yes in S205), the page data generating unit 2210 spools the next page (step S206). After the step S206, the step S204 is performed.

As described above, the image forming apparatus 20 according to the present embodiment appropriately determines the number of pages to be spooled, and the multi-core CPU 201 performs the spooling process and the parsing/rendering process in parallel. This reduces the time required for printing the PDF file.

Additionally, when the number of CPU cores is sufficiently large, it is also possible to perform a plurality of parsing processes and rendering processes in parallel. The case where the number of CPU cores is sufficiently large means that if one CPU core performs the parsing process and the rendering process, another CPU core can be used for performing the parsing process and the rendering process.

FIG. 24 is a timing chart illustrating an example of the time required for printing a PDF file, in a case where two parsing processes and two rendering processes are performed in parallel. In FIG. 24, a parsing process 1 and a parsing process 2 are performed in parallel, and a rendering process 1 and a rendering process 2 are performed in parallel. Therefore, in comparison with FIG. 21, the parsing process and the rendering process performed for six pages are completed in a shorter time. In the example of FIG. 24, the printing/discharging process for one page takes time so that the total time required to complete the whole printing process is substantially the same as that in the process illustrated in FIG. 21. However, in a case of intensive printing, namely to print more than one page on one sheet, the time required to complete the whole printing process can be reduced in the example of FIG. 24.

According to one of the embodiments described above, the image forming apparatus 20 can reduce the time required to perform a printing process on a file in a random-access format.

In the image forming method according to one of the embodiments described above, the communication unit 2300 of the image forming apparatus 20 receives a PDF file that includes objects for rendering the pages and a cross-reference table PR including position information of the objects. Additionally, the cross-reference table PR is to be read after the objects. Reading the cross-reference table PR after the objects indicates that the cross-reference table PR has an offset that has a size larger than that of the objects in the PDF file. Additionally, the PDF file is replaceable with an arbitrary file in a random-access format. The print data processing unit 2220 of the image forming apparatus 20 according to one of the embodiments described above starts a printing process for printing a predetermined image based on objects specified by, for example, specifying information or boundary information that specifies a position of the objects of a predetermined page without waiting until the communication unit 2300 receives the entire PDF file, when the specifying information or the like of the PDF file is read before the cross-reference table PR of the PDF file by the communication unit 2300. Additionally, reading the specifying information or the like before the cross-reference table PR indicates that the specifying information or the like has an offset that has a size smaller than that of the cross-reference table PR in the PDF file. Accordingly, the image forming apparatus 20 can start the printing process without waiting for the completion of receiving the entire PDF file, resulting in reduction of the time required for printing the PDF file.

A page data generating unit 2210 of the image forming apparatus 20 generates divided files by dividing the objects into units of objects (page object) from the PDF file based on the specifying information or the like. The print data processing unit 2220 of the image forming apparatus 20 starts printing a predetermined page based on the divided files generated by the page data generating unit 2210. This allows the image forming apparatus 20 to print the divided files by using an existing function included in the plotter engine 211.

When the PDF file includes the determination information indicating that the PDF file is dividable to generate divided files, the print data processing unit 2220 starts printing an image corresponding to a predetermined page. Thereby, when the specifying information is read, the image forming apparatus 20 can immediately determine whether to generate divided files.

In the PDF file, the boundary information is arranged between a page object (a unit of objects) of a predetermined page and another page object (a unit of objects) of another page. This allows the image forming apparatus 20 to detect a boundary between units of objects of different page, namely, boundary between the predetermined page and the other pages, while reading the objects of the predetermined page.

In the PDF file, the specifying information is position information that indicates the position of objects of the predetermined page. This allows the image forming apparatus 20 to specify the objects of the predetermined page without referring to the cross-reference table PR.

The page data generating unit 2210 of the image forming apparatus 20 determines whether the divided files in which the objects of the predetermined pages are divided is able to be generated from the PDF file. When determining that the divided files are able to be generated, the page data generating unit 2210 generates the divided files of the predetermined pages. This allows the image forming apparatus 20 to generate the divided files from the PDF file that does not include the determination information.

The storage unit 2000 of the image forming apparatus 20 stores the objects received by the communication unit 2300. The page data generating unit 2210 of the image forming apparatus 20 generates the divided files based on the objects stored in the storage unit 2000. This allows the image forming apparatus 20 to generate the divided files using the objects stored in the storage unit 2000, even if the object of reference destination does not remain in the buffer generating the divided files of predetermined pages.

The reading unit 2110 of the image forming apparatus 20A reads an image of a document. The image generating unit 2120 of the image forming apparatus 20A has the objects indicating the image read by the reading unit 2110, the cross-reference table PR indicating positions of the objects, and the specifying information specifying the position of the objects of the predetermined page, and generates a file of which the cross-reference table PR is to be read after the objects and the specifying information or the like. Reading the cross-reference table PR after the objects and the specifying information or the like indicates that the cross-reference table PR has an offset that has a size larger than that of the objects and the specifying information or the like. This allows the image forming apparatus 20A to generate a PDF file dividable to generate divided files. Additionally, the image forming apparatus 20A having an image generating function and the image forming apparatus 20B having a printing function may configure as an image forming system. In the case of the above-described image forming system including the image forming apparatus 20A and the image forming apparatus 20B, the image forming apparatus 20A receives a PDF file from the terminal 10, generates the divided files, and then transmits the divided files to the image forming apparatus 20B. Upon receiving the divided files, the image forming apparatus 20B starts executing a printing process.

Supplementary Information on Embodiment

The programs for the terminal 10 and the image forming apparatus 20 may be recorded, as a file in installable format or executable format, in a computer-readable recording medium to be distributed. Examples of such recording medium include, but are not limited to, compact disc-recordable (CD-R), digital versatile disc (DVD), and Blu-ray disc. In addition, the above-mentioned recording medium, or a hard disk (HD) in which these programs are stored can be provided as a program product.

Further, the terminal 10 and the image forming apparatus 20 in the above embodiment may be constructed by a single apparatus, or a plurality of apparatuses arbitrarily assigned by dividing each function.

Each of the functions of the described embodiments may be implemented by one or more processing circuits or circuitry. A processing circuit, or processing circuitry, includes a programmed processor, as a processor includes circuitry. The processing circuit also includes a device such as an application specific integrated circuit (ASIC), digital signal processor (DSP), field programmable gate array (FPGA), and conventional circuit components arranged to perform the recited functions.

Any one of the above-described operations may be performed in various other ways, for example, in an order different from the one described above.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image forming apparatus, comprising circuitry configured to:
   when beginning to receive at least a portion of a file including data of a plurality of pages and position information indicating individual positions of data of the plurality of pages;
   transmit, after receiving at least the portion of the file and before determining whether at least the portion of the file includes determination information indicating at least the portion of the file is dividable, a print start notification to start printing of the plurality of pages;
   determine, upon receiving the print start notification, whether at least the portion of the file includes determination information indicating that at least the portion of the file is dividable to generate divided files; and generate, before buffering all of the plurality of pages, divided files from at least the portion of the file and print generated files sequentially when at least the portion of the file includes the determination information, wherein when generating each of the divided files, the circuitry
extracts data for a predetermined number of pages based on boundary information indicating a boundary of each page included in at least the portion of the file,
generates information indicating the position of the data in the divided file, and
generates a file including the extracted data and information indicating a generated position.

2. The image forming apparatus of claim 1,
wherein, when at least the portion of the file includes determination information indicating that at least the portion of the file is dividable to generate divided files, the circuitry starts printing of at least two of the plurality of pages.

3. The image forming apparatus of claim 1,
wherein the boundary information is arranged between pages of the plurality of pages included in at least the portion of the file.

4. The image forming apparatus of claim 2,
wherein the circuitry:
determines whether at least the portion of the file includes the determination information indicating that at least the portion of the file is dividable to generate the divided files to determine whether divided files including the data of one of the plurality of pages are to be generated; and
generates the divided files including the data of one of the plurality of pages in response to a determination indicating that at least the portion of the file is dividable to generate the divided files including the data of one of the plurality of pages.

5. The image forming apparatus of claim 2,
wherein, when at least the portion of the file includes no determination information that indicates that at least the portion of the file is dividable to generate a divided file, the circuitry:
determines whether at least the Portion of the file is dividable to generate divided files including the data of one of the plurality of pages according to whether an object to be referred is one of a preceding object arranged in another page and an object arranged in a latter page; and
generates the divided file of the data of one of the plurality of pages in response to a determination indicating that at least the portion of the file is dividable to generate the divided files including the divided file of the data of one of the plurality of pages.

6. The image forming apparatus of claim 5,
wherein, when a determination indicating that at least the portion of the file is not dividable to generate divided files including the divided file of the data of one of the plurality of pages is made in processing a page being after a first page of the plurality of pages, the circuitry:
stops generating the divided files including the data of one of the plurality of pages; and
starts printing of pages, on which a discharging process is not performed yet, from at least the portion of the file that includes the data of the plurality of pages and position information indicating individual positions of data of the plurality of pages.

7. The image forming apparatus of claim 4,
wherein, when at least the portion of the file includes the determination information indicating that at least the portion of the file is dividable to generate divided files and the circuitry changes a determination indicating that at least the portion of the file is dividable to generate divided files determined due to the determination information to a determination indicating that at least the portion of the file is not dividable to generate divided files in processing a page being after a first page of the plurality of pages,
the circuitry:
stops generating the divided files including a divided file of the data of one of the plurality of pages; and
starts printing of pages, on which a discharging process is not performed yet, from at least the portion of the file that includes the data of the plurality of pages and position information indicating individual positions of data of the plurality of pages.

8. The image forming apparatus of claim 1, further comprising a memory configured to store the data received by the circuitry, and
wherein the circuitry generates the divided files based on the data stored in the memory.

9. The image forming apparatus of claim 1,
wherein the circuitry determines one of whether the number of pages included in one of the divided files is the number of pages that is to be printed on one side of a sheet, whether the number of pages included in one of the divided files is the number of pages that is to be printed on both sides of a sheet, and whether a file includes one page in a case of intensive printing.

10. The image forming apparatus of claim 8,
wherein the circuitry determines an upper limit number of pages to be included in the divided files according to the number of available central processing unit (CPU) cores and available capacity of the memory, and
generates, from at least the portion of the file, the divided files including pages corresponding to the determined upper limit number.

11. The image forming apparatus of claim 10,
wherein the image forming apparatus includes a plurality of CPU cores, and performs a spooling process and one of a parsing process and a rendering process in parallel.

12. The image forming apparatus of claim 1, wherein the circuitry
reads an image, and
generates a file including data of a plurality of pages, position information indicating positions of data of the plurality of pages, and information indicating a position of one of the plurality of pages, the position information being read after the data of the plurality of pages and the information indicating a position of one of the plurality of pages is received.

13. The image forming apparatus of claim 1, wherein when generating each of the divided files, in response to completing a reception of the data for the predetermined number of pages based on the boundary information, the circuitry starts generation of the divided files including the data for the predetermined number of pages.

14. An image forming system, comprising:
the image forming apparatus of claim 1; and
a generator configured to generate a file including data of a plurality of pages, position information indicating individual positions of data of the plurality of pages, and information indicating a position of data of one of the plurality of pages, wherein the file is to be read in a manner that the position information is read after the data of the plurality of pages and the information indicating a position of data of one of the plurality of pages.

15. A communication system, comprising:
the image forming apparatus of claim 1; and
a communication terminal configured to transmit a file to the image forming apparatus.

16. A method of forming an image performed by an image forming apparatus, comprising:
receiving at least the portion of a file including data of a plurality of pages and position information indicating individual positions of data of the plurality of pages;
transmitting, after receiving at least the portion of the file and before determining whether at least the portion of the file includes determination information indicating at least the portion of the file is dividable, a print start notification to start printing of the plurality of pages;
determining, upon receiving the print start notification, whether at least the portion of the file includes determination information indicating that at least the portion of the file is dividable to generate divided files; and
generating, before buffering all of the plurality of pages, divided files from at least the portion of the file and printing generated files sequentially when at least the portion of the file includes the determination information, wherein
when generating each of the divided files, includes
extracting data for a predetermined number of pages based on boundary information indicating a boundary of each page included in at least the portion of the file,
generating information indicating the position of the data in the divided file, and
generating a file including the extracted data and information indicating a generated position.

17. A non-transitory recording medium storing a plurality of instructions which, when executed by one or more processors, cause the processors to perform a method performed by an image forming apparatus, comprising:
receiving at least the portion of a file including data of a plurality of pages and position information indicating individual positions of data of the plurality of pages;
transmitting, after receiving at least the portion of the file and before determining whether at least the portion of the file includes determination information indicating at least the portion of the file is dividable, a print start notification to start printing of the plurality of pages;
determining, upon receiving the print start notification, whether at least the portion of the file includes determination information indicating that at least the portion of the file is dividable to generate divided files; and
generating, before buffering all of the plurality of pages, divided files from at least the portion of the file and printing generated files sequentially when at least the portion of the file includes the determination information, wherein
when generating each of the divided files, includes
extracting data for a predetermined number of pages based on boundary information indicating a boundary of each page included in at least the portion of the file,
generating information indicating the position of the data in the divided file, and
generating a file including the extracted data and information indicating a generated position.

* * * * *